(12) United States Patent
Wald et al.

(10) Patent No.: US 12,522,335 B1
(45) Date of Patent: Jan. 13, 2026

(54) MARINE DRIVES HAVING NOISE AND VIBRATION ISOLATING JOINT

(71) Applicant: Brunswick Corporation, Mettawa, IL (US)

(72) Inventors: Benjamin C. Wald, Stillwater, OK (US); Andrew S. Waisanen, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 652 days.

(21) Appl. No.: 17/865,970

(22) Filed: Jul. 15, 2022

(51) Int. Cl.
*B63H 20/32* (2006.01)
*F16F 15/08* (2006.01)
*H02K 5/132* (2006.01)
*H02K 5/24* (2006.01)

(52) U.S. Cl.
CPC ............. *B63H 20/32* (2013.01); *F16F 15/08* (2013.01); *H02K 5/132* (2013.01); *H02K 5/24* (2013.01)

(58) Field of Classification Search
CPC ......... B63H 20/32; B63H 21/17; F16F 15/08; H02K 5/132; H02K 5/24
See application file for complete search history.

(56) References Cited

U.S. PATENT DOCUMENTS

| | | | |
|---|---|---|---|
| 3,358,668 A | 12/1967 | Post | |
| 3,593,050 A * | 7/1971 | Ware | H02K 5/132 310/87 |
| 3,853,730 A | 12/1974 | Anderson | |
| 3,953,742 A | 4/1976 | Anderson et al. | |
| 3,954,082 A * | 5/1976 | Roller | B63H 20/007 310/87 |
| 3,995,513 A * | 12/1976 | Amdall | F16F 15/10 464/92 |
| 4,322,633 A | 3/1982 | Staerzl | |
| 4,492,877 A | 1/1985 | Staerzl | |

(Continued)

FOREIGN PATENT DOCUMENTS

| | | |
|---|---|---|
| CA | 1040134 | 10/1978 |
| CA | 1056766 | 6/1979 |

(Continued)

OTHER PUBLICATIONS

Sawyer et al., Unpublished U.S. Appl. No. 17/469,479, filed Sep. 8, 2021.

(Continued)

*Primary Examiner* — Stephen P Avila
(74) *Attorney, Agent, or Firm* — Andrus Intellectual Property Law, LLP

(57) ABSTRACT

A marine drive is for propelling a marine vessel in a body of water. The marine drive has a motor housing, the motor housing having a first housing portion and a second housing portion which together define a motor cavity; an electric motor nested in the first housing portion, the electric motor being configured to cause rotation of an output shaft axially extending from the first housing portion; a propulsor coupled to the output shaft so that rotation of the output shaft causes rotation of the propulsor; and an elastomeric isolator located radially between the electric motor and the first housing portion. The elastomeric isolator is configured to isolate vibrations emanating from the electric motor and limit transfer of said vibrations to the first housing portion.

19 Claims, 15 Drawing Sheets

(56) References Cited

U.S. PATENT DOCUMENTS

| | | |
|---|---|---|
| 4,528,460 A | 7/1985 | Staerzl |
| 4,583,953 A | 4/1986 | Nakase |
| 4,632,487 A | 12/1986 | Wargula |
| 4,787,868 A * | 11/1988 | Hoshiba ............... B63H 21/305 464/180 |
| 4,897,059 A | 1/1990 | Newman |
| 4,969,847 A | 11/1990 | Curtis |
| 5,188,548 A | 2/1993 | Ferguson et al. |
| 5,192,235 A | 3/1993 | Dunham et al. |
| 5,219,306 A | 6/1993 | Takahashi |
| 5,511,997 A | 4/1996 | Yoshida |
| 5,747,892 A | 5/1998 | Staerzl |
| 5,840,164 A | 11/1998 | Staerzl |
| 6,183,625 B1 | 2/2001 | Staerzl |
| 6,209,472 B1 | 4/2001 | Staerzl |
| 6,547,952 B1 | 4/2003 | Staerzl |
| 6,559,660 B1 | 5/2003 | Staerzl |
| 6,822,462 B1 | 11/2004 | Staerzl |
| 6,913,498 B1 | 7/2005 | Sheth |
| 7,064,459 B1 | 6/2006 | Staerzl |
| 7,131,877 B1 | 11/2006 | Staerzl |
| 7,305,928 B2 | 12/2007 | Bradley et al. |
| 7,381,312 B1 | 6/2008 | Misorski et al. |
| 7,387,553 B1 | 6/2008 | Misorski et al. |
| 7,896,304 B1 | 3/2011 | Eichinger et al. |
| 8,118,983 B1 | 2/2012 | Anderson et al. |
| 8,372,260 B1 | 2/2013 | Staerzl et al. |
| 9,168,979 B1 | 10/2015 | Schueller et al. |
| 9,446,828 B1 | 9/2016 | Groeschel et al. |
| 9,701,383 B1 | 7/2017 | Stuber et al. |
| 9,764,813 B1 | 9/2017 | Zarembka et al. |
| 9,963,213 B1 | 5/2018 | Jaszewski et al. |
| 10,202,180 B1 | 2/2019 | Amerling et al. |
| 10,246,173 B1 | 4/2019 | Ingebritson |
| 10,696,367 B1 | 6/2020 | Ingebritson et al. |
| 10,787,236 B1 | 9/2020 | Erickson et al. |
| 10,981,637 B1 | 4/2021 | Alby et al. |
| 11,097,826 B1 | 8/2021 | Dannenberg et al. |
| 11,180,235 B2 | 11/2021 | Wiatrowski |
| 11,186,352 B1 | 11/2021 | Erickson et al. |
| 11,214,346 B1 | 1/2022 | Jaeger et al. |
| 2010/0055999 A1 | 3/2010 | Wright |
| 2017/0129577 A1 | 5/2017 | Mizutani |
| 2019/0061512 A1 * | 2/2019 | Noguez ................ F16F 15/08 |

FOREIGN PATENT DOCUMENTS

| | | | |
|---|---|---|---|
| EP | 0479576 A2 * | 5/1992 | .......... F04B 39/1073 |
| GB | 2133592 | 8/1986 | |
| WO | WO-2009055663 A1 * | 4/2009 | ............... H02K 5/24 |

OTHER PUBLICATIONS

Fergus et al., Unpublished U.S. Appl. No. 17/487,116, filed Sep. 28, 2021.

Schrank et al., Unpublished U.S. Appl. No. 17/509,739, filed Oct. 25, 2021.

Jaszewski, et al., Unpublished U.S. Appl. No. 17/550,463, filed Dec. 14, 2021.

Dannenberg, et al., Unpublished U.S. Appl. No. 17/554,540, filed Dec. 17, 2021.

Jaszewski, et al., Unpublished U.S. Appl. No. 17/585,214, filed Jan. 26, 2022.

Waldvogel, et al., Unpublished U.S. Appl. No. 17/671,041, filed Feb. 14, 2022.

Declaration of Prior Art signed by inventor Benjamin C. Wald on Sep. 2, 2022.

Office Action issued in U.S. Appl. No. 17/866,000, dated Feb. 27, 2025.

Office Action issued in U.S. Appl. No. 18/219,438, dated Oct. 2, 2025.

* cited by examiner

MARINE DRIVES HAVING NOISE AND VIBRATION ISOLATING JOINT

FIELD

The present disclosure relates to marine drives for propelling a marine vessel in water, and more particularly to marine drives having one or more noise and vibration isolating joints.

BACKGROUND

The following U.S. Patents and Applications are incorporated by reference in entirety.

U.S. Pat. No. 9,701,383 discloses a marine propulsion support system having a transom bracket, a swivel bracket, and a mounting bracket. A drive unit is connected to the mounting bracket by a plurality of vibration isolating mounts, which are configured to absorb loads on the drive unit that do not exceed a mount design threshold. A bump stop located between the swivel bracket and the drive unit limits deflection of the drive unit caused by loads that exceed the threshold. An outboard motor includes a transom bracket, a swivel bracket, a cradle, and a drive unit supported between first and second opposite arms of the cradle. First and second vibration isolating mounts connect the first and second cradle arms to the drive unit, respectively. An upper motion-limiting bump stop is located remotely from the vibration isolating mounts and between the swivel bracket and the drive unit.

U.S. Pat. No. 9,963,213 discloses a system for mounting an outboard motor propulsion unit to a marine vessel transom. The propulsion unit's midsection has an upper end supporting an engine system and a lower end carrying a gear housing. The mounting system includes a support cradle having a head section coupled to a transom bracket, an upper structural support section extending aftward from the head section and along opposite port and starboard sides of the midsection, and a lower structural support section suspended from the upper structural support section and situated on the port and starboard sides of the midsection. A pair of upper mounts couples the upper structural support section to the midsection proximate the engine system. A pair of lower mounts couples the lower structural support section to the midsection proximate the gear housing. At least one of the upper and lower structural support sections comprises an extrusion or a casting.

U.S. patent application Ser. No. 17/469,479 discloses a propulsion device for rotating a propulsor to propel a marine vessel. The propulsion device includes a drive housing having a cavity that extends along a first central axis. A motor is positioned within the cavity. The motor rotates a shaft extending along a second central axis that is non-coaxial with the first central axis. The shaft is configured to rotate the propulsor to propel the marine vessel.

U.S. patent application Ser. No. 17/487,116 discloses an outboard motor having a transom clamp bracket configured to be supported on a transom of a marine vessel and a swivel bracket configured to be supported by the transom clamp bracket. A propulsion unit is supported by the swivel bracket, the propulsion unit comprising a head unit, a midsection below the head unit, and a lower unit below the midsection. The head unit, midsection, and lower unit are generally vertically aligned with one another when the outboard motor is in a neutral tilt/trim position. The propulsion unit is detachable from the transom clamp bracket.

U.S. patent application Ser. No. 17/509,739 discloses an apparatus for removably supporting a marine drive on a marine vessel. The apparatus has a transom bracket assembly for mounting to the marine vessel, a steering bracket for coupling the marine drive to the transom bracket assembly so the marine drive is steerable relative to the transom bracket assembly and the marine vessel, and an integrated copilot and locking mechanism configured to retain the steering bracket in a plurality of steering orientations. The mechanism is further configured to lock and alternately unlock the steering bracket relative to the transom bracket assembly so that in a locked position the marine drive is retained on the transom bracket assembly and so that in an unlocked position the marine drive is removable from the transom bracket assembly.

U.S. patent application Ser. No. 17/550,463 discloses a marine drive having a supporting frame for coupling the marine drive to a marine vessel, a gearcase supporting a propulsor for propelling the marine vessel in water, an extension leg disposed between the supporting frame and the gearcase, and an adapter plate between the supporting frame and the extension leg. A tube is in the extension leg. The tube has a lower end which is coupled to the gearcase and upper end which is coupled to the adapter plate by a compression nut threaded onto the tube, wherein threading the compression nut down on the tube compressively engages the compression nut with the adapter plate, which in turn clamps the extension leg between the supporting frame and the gearcase.

U.S. patent application Ser. No. 17/554,540 discloses an outboard motor having a cowling, a gearcase, a midsection located axially between the cowling and the gearcase, a steering arm extending forwardly from the midsection, and an anti-ventilation plate between the midsection and the gearcase. A wing extends laterally from the steering arm. The wing, a lateral side of the cowling, and a lateral side of the gearcase together define a side tripod which supports the outboard motor in a side laydown position. The anti-ventilation plate has a rear edge with laterally outer rear support members, which together with the rear of the cowling form a rear tripod which supports the outboard motor in a rear laydown position.

U.S. patent application Ser. No. 17/585,214 discloses a marine drive for propelling a marine vessel. The marine drive has a propulsor configured to generate a thrust force in a body of water; a battery that powers the propulsor; and a supporting frame which supports the marine drive relative to marine vessel. The supporting frame has a monolithic body defining a frame interior, and further has a support leg extending downwardly from the monolithic body and a steering arm extending forwardly from monolithic body. A cowling is fixed to the supporting frame via at least one hidden fastener that extends from the frame interior, through the supporting frame, and into engagement with the cowl body, wherein hidden fastener being accessible during installation.

U.S. patent application Ser. No. 17/671,041 discloses a marine drive for propelling a marine vessel in a body of water. The marine drive comprises a gearcase defining a motor cavity; a motor disposed in the motor cavity; a propulsor shaft extending from the gearcase, wherein the motor is configured to cause rotation of the propulsor shaft; a propulsor which is rotated by the propulsor shaft to create a thrust force in the body of water; and a vent conduit having a first end connected to the motor cavity and a second end which vents the motor cavity to atmosphere.

SUMMARY

This Summary is provided to introduce a selection of concepts which are further described below in the Detailed Description. This Summary is not intended to identify key or essential features of the claimed subject matter, nor is it intended to be used as an aid in limiting the scope of the claimed subject matter.

In examples disclosed herein, a marine drive is for propelling a marine vessel in a body of water. The marine drive has a supporting frame configured to support the marine drive with respect to the marine vessel, an extension leg depending on the supporting frame, a motor housing depending on the extension leg, the motor housing for containing an electric motor, and a vibration isolating joint which couples the extension leg to the supporting frame. The vibration isolating joint has an isolating connector assembly including an elastomeric member which is clamped between the extension leg and the supporting frame and configured to limit transfer of vibrations from the extension leg to the supporting frame, and a compression limiter which prevents over clamping of the elastomeric member during assembly of the extension leg and the motor housing.

In examples disclosed herein, a marine drive is for propelling a marine vessel in a body of water. The marine drive has a supporting frame configured to support the marine drive with respect to the marine vessel; an extension leg depending on the supporting frame; a motor housing depending on the extension leg, the motor housing for containing an electric motor; and a vibration isolating joint which couples the extension leg to the motor housing. The vibration isolating joint has an isolating connector assembly having an elastomeric member which is clamped between the extension leg and motor housing and configured to limit transfer of vibrations from the motor housing to the extension leg, and a compression limiter which prevents over clamping of the elastomeric member during assembly of the extension leg and the motor housing.

In examples disclosed herein, a marine drive is for propelling a marine vessel in a body of water. The marine drive has a motor housing, the motor housing having a first housing portion and a second housing portion which together define a motor cavity; an electric motor nested in the first housing portion, the electric motor being configured to cause rotation of an output shaft extending from the first housing portion; and a propulsor coupled to the output shaft so that rotation of the output shaft causes rotation of the propulsor. A vibration isolating joint couples first housing portion to the second housing portion. The vibration isolating joint comprises an isolating connector assembly having an elastomeric member which is clamped between the first housing portion and the second housing portion and is configured to limit transfer of vibrations from the first housing portion to the second housing portion, and a compression limiter which prevents over clamping of the elastomeric member during assembly of the motor housing.

In examples disclosed herein, a marine drive is for propelling a marine vessel in a body of water. The marine drive has a motor housing, the motor housing having a first housing portion and a second housing portion which together define a motor cavity; an electric motor nested in the first housing portion, the electric motor being configured to cause rotation of an output shaft axially extending from the first housing portion; a propulsor coupled to the output shaft so that rotation of the output shaft causes rotation of the propulsor; and an elastomeric isolator located radially between the electric motor and the first housing portion. The elastomeric isolator is configured to isolate vibrations emanating from the electric motor and limit transfer of said vibrations to the first housing portion.

BRIEF DESCRIPTION OF THE DRAWINGS

The present disclosure includes the following Figures.

DETAILED DESCRIPTION

The invention described herein below has been found to be particularly useful in configurations of marine drives having an electric motor located in a lower gearcase and being configured to power a propulsor, such as one or more propeller(s), impeller(s), and/or the like. The illustrated embodiment is just one example of such a marine drive, however the present invention is not limited for use with the illustrated configuration, and in other examples the present invention can be implemented in differently configured marine drives having an internal combustion engine, a hybrid-electric powerhead, and/or the like. The configurations of the marine drive shown and described herein below, including the supporting frame, electric motor, and gearcase, are merely exemplary. The present invention is also useful in conjunction with many other marine drive configurations.

During research and development in the field of marine drives, the present inventors determined that electric motors can be rich in harmonic content, and the noise generated is very tonal and prominent. This may result in poor sound quality, which users may consider annoying or irritating and can present as an unrefined product. The vibrations created by electric motors in existing marine propulsion devices can travel up through the various structures and joints of the propulsion device with minimal resistance. Through their research and experimentation, the inventors determined that it would be advantageous to provide vibration isolating (i.e. dampening) features that isolate the motor from other portions of the marine drive. The present disclosure is a result of the present inventors' efforts in this regard.

Figure 1:
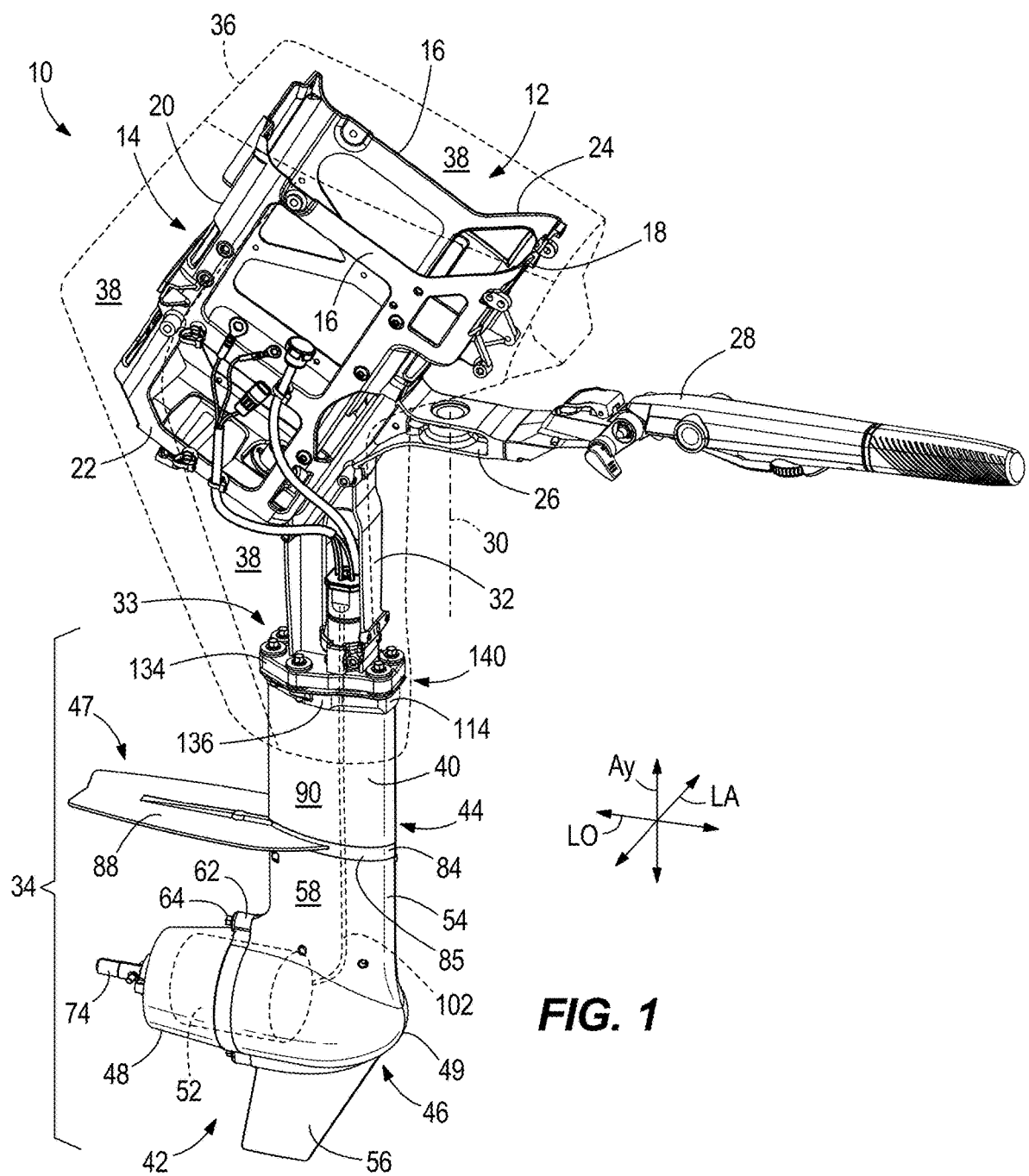
FIG. 1 is a side perspective view of a first embodiment of a marine drive for propelling a marine vessel in water according to the present disclosure.

FIG. 1 depicts a marine drive 10 for propelling a marine vessel in a body of water. In the illustrated embodiment, the marine drive 10 extends from top to bottom in an axial direction AX, from front to back in a longitudinal direction LO which is perpendicular to the axial direction AX, and from side to opposite side in a lateral direction LA which is perpendicular to the axial direction AX and perpendicular to the longitudinal direction LO. FIG. 1 only depicts certain portions of the marine drive 10. Although not shown, the marine drive 10 is attachable to the marine vessel via, for example, a conventional transom bracket and/or the like. Other suitable arrangements are provided in the above-incorporated patents, and others are widely commercially available for purchase from Brunswick Corporation and its companies Attwood and Mercury Marine, among others.

The marine drive 10 is an outboard motor having a supporting frame 12 for rigidly supporting the various components of the marine drive 10 with respect to the marine vessel. The supporting frame 12 has a generally rectangular, box-shaped body 14 with port and starboard sides 16, a front side 18, a rear side 20, a bottom 22, and an open upper end 24 providing access to a frame interior for containing a rechargeable battery (not shown) providing battery power to the marine drive 10. The supporting frame 12 also has a steering arm 26 extending forwardly from the front side 18 of the body 14. The steering arm 26 is configured for connection to a tiller arm 28 for manually steering the marine drive 10 relative to the marine vessel about a steering axis 30, which is defined by the above-noted transom bracket. See, for example, the presently-incorporated U.S. patent application Ser. No. 17/509,739.

A cowling, shown schematically at 36, is fixed to and surrounds most or all of the body 14 of the supporting frame 12, as further disclosed in the above-incorporated U.S. patent application Ser. No. 17/585,214. The cowling 36 defines a cowling interior 38 in which the body 14 of the supporting frame 12 and various components of the marine drive 10 are disposed. It should be understood that the various components described above are exemplary and could vary from what is shown. For example, the present invention is not limited for use with the particular type of supporting frame shown in the figures. The supporting frame can be any type of supporting frame known in the art for framing and supporting portions of the marine drive, including being configured to support various components of the marine drive, and/or to couple the marine drive to the marine vessel. Embodiments of various other suitable supporting frames for marine drives are provided in the above-incorporated patents.

The supporting frame 12 has a support leg 32 extending downwardly from the bottom 22 of the body 14 and having a lower end 33 that is coupled to the lower unit 34 of the marine drive 10 by a novel vibration isolating joint 140. The lower unit 34 generally includes a motor housing 42, an extension leg 44, and an anti-ventilation plate 47 disposed between the motor housing 42 and the extension leg 44. The extension leg 44 depends on the supporting frame 12, and the motor housing 42 depends on the extension leg 44. The motor housing 42 has a front housing portion 46 and a rear housing portion 48 that are mated together and define a motor cavity 50 for containing an electric motor 52 (see, e.g., FIG. 4) and related componentry, which otherwise defines a generally open space that is devoid of fluid. The front housing portion 46 has a nosecone 49 with a smooth outer surface which transitions to an upwardly extending stem 54 and a downwardly extending skeg 56.

Figure 4:
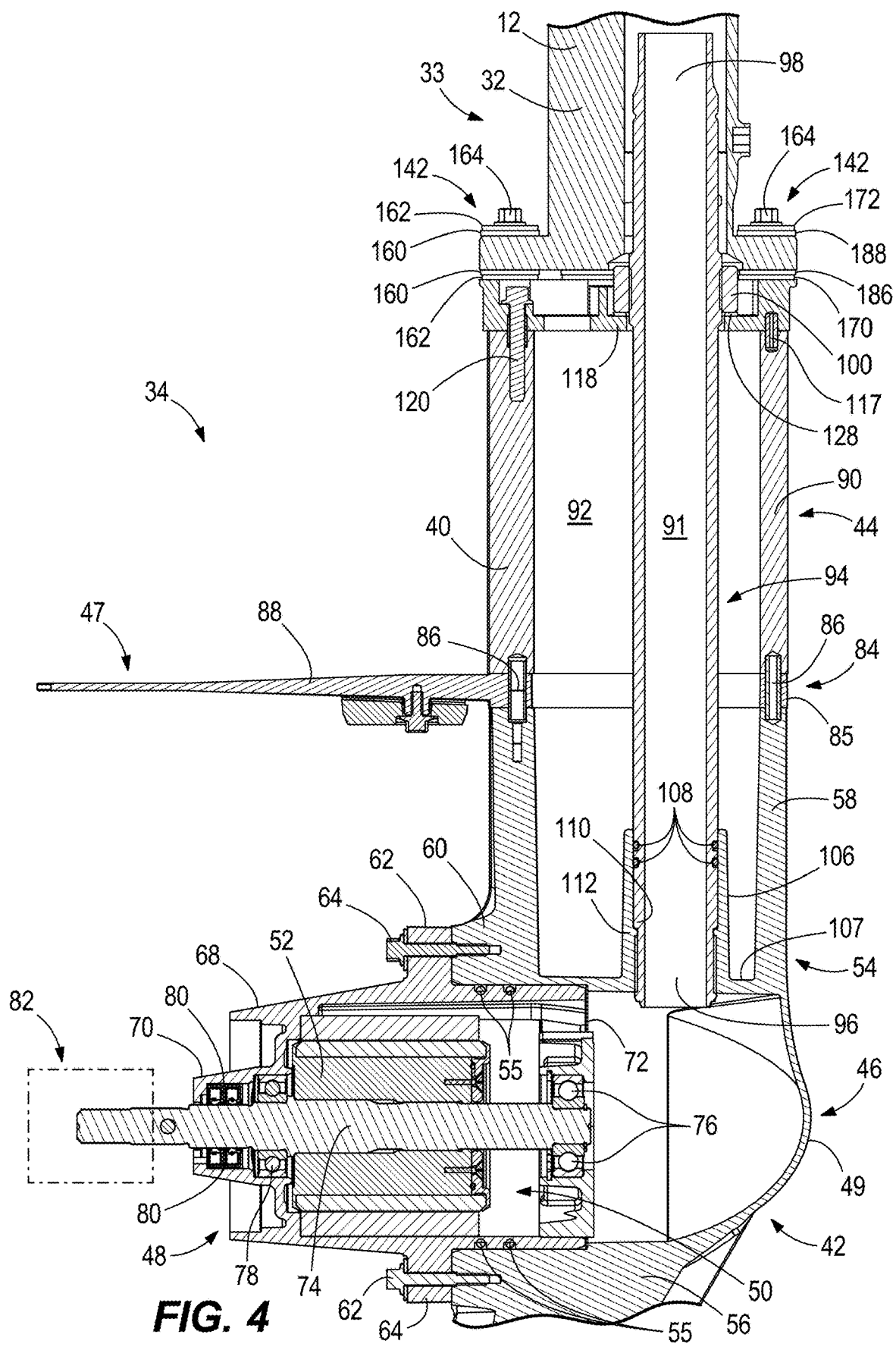
FIG. 4 is a view of Section 4-4, taken in FIG. 2.

Referring to FIG. 4, the stem 54 has a perimeter sidewall 58 which may be monolithic so as to avoid visible fasteners or unsightly seams. In other embodiments, it can be made of multiple pieces. The nosecone 49 is generally located axially between the stem 54 and the skeg 56 and protrudes forwardly therefrom. The front housing portion 46 also has a rear-facing annular body portion 60 which receives the rear housing portion 48 in the nested configuration shown. Static O-ring seals 55 are located radially between the front housing portion 46 and rear housing portion 48 and are configured to seal these components together preferably so as to entirely prevent water intrusion into the motor cavity 50. The rear housing portion 48 has a radially outer annular flange 62. Fasteners 64 extend through smooth bores in the radially outer annular flange 62 and into threaded engagement with corresponding threaded bores in the face of the rear-facing annular body portion 60 of the front housing portion 46, so as to firmly fasten the rear housing portion 48 to the front housing portion 46 in the nested arrangement shown. The rear housing portion 48 is generally cylindrical, having a perimeter sidewall 68 which smoothly tapers radially inwardly towards its rear end.

The electric motor 52 is generally cylindrical and is contained within the rear housing portion 48, in particular being mounted between a rear end cap 70 and a front end wall 72 of the rear housing portion 48. The electric motor 52 causes rotation of a propulsor shaft 74 which longitudinally extends from the rear of the rear housing portion 48 via the rear end cap 70. The electric motor 52 is a conventional item, for example an axial flux motor, a radial flux motor, or a transverse flux motor, such as those produced by Electric Torque Machines of Flagstaff, Arizona (a Graco Company). Front and rear bearings 76, 78 support and facilitate rotation of the propulsor shaft 74 relative to the electric motor 52. Annular dynamic seals 80 surround the propulsor shaft 74 and dynamically seal the rear housing portion 48 via the rear end cap 70 to the rotating propulsor shaft 74 and preferably prevents ingress of water to the motor cavity 50. A conventional propulsor, shown schematically at box 82 in FIG. 4, is mounted on the outer end of the propulsor shaft 74 such that rotation of the propulsor shaft 74 by the electric motor 52 causes rotation of the propulsor 82, which in turn generates a thrust force for propelling the marine vessel in water. The type and configuration of the propulsor 82 can vary, and for example can include one or more propellers, impellers, and/or the like.

With continued reference to FIG. 4, the anti-ventilation plate 47 has a head 84 at its forward end which is sandwiched between the lower end of the extension leg 44 and the stem 54 of the front housing portion 46. The head 84 has a perimeter sidewall 85 with a rounded forward end and a tapered rear end. The perimeter sidewall 85 is preferably monolithic so as to avoid external fasteners or other unsightly seams. In other examples it can be made of multiple pieces. The radially outer profile of the head 84 generally matches the radially outer profile of the lower end of the extension leg 44 and the radially outer profile of the upper end of the stem 54, in particular such that these components together provide a smooth outer surface which is streamlined and encounters minimal hydrodynamic drag as the marine vessel travels through the water. Pins 86 register and maintain the head 84 of the anti-ventilation plate 47 in alignment with the stem 54 and the lower end of the extension leg 44. The pins 86 extend through bores formed through the head 84 of the anti-ventilation plate 47 and into corresponding bores formed in the lower end of the extension leg 44 and in the upper end of the stem 54. The anti-ventilation plate 47 has a generally flat tail 88 which extends rearwardly from both sides of the head 84.

The extension leg 44 includes an elongated body 40 having the perimeter sidewall 90 which defines a hollow interior 92. The elongated body 40 is preferably monolithic to as to avoid externally visible fasteners or unsightly seam lines. In other embodiments it can be formed from multiple pieces. A rigid conduit portion or tube 94 is located in the hollow interior 92. The tube 94 is generally impervious to fluids and has a hollow interior 91, a lower end 96 which is fixedly coupled to the motor housing 42 and an upper end 98 which is coupled to the supporting frame 12 via a compression nut 100, as further described herein below. In the non-limiting illustrated embodiments, the tube 94 is a monolithic aluminum tube. The hollow interior 91 provides a passageway for among other things, a wiring harness comprising electrical wires 102 extending from an upper portion of the marine drive 10 to the motor cavity 50, and for connection to the electric motor 52, i.e., for providing electricity to the electric motor 52 and/or for controlling the electric motor 52.

The lower end 96 of the tube 94 is fixedly or rigidly coupled to the motor housing 42 by a threaded connection 104 comprising outer threads on the outer diameter of the tube 94 and inner threads on the inner diameter of a cylindrical stack 106 extending upwardly from a bottom wall 107 of the stem 54. Static O-ring seals 108 provide a seal between the outer diameter of the tube 94 and the inner diameter of the cylindrical stack 106 and prevents ingress of water into the motor cavity 50. Thus the motor cavity 50 is effectively sealed from intrusion of water via the seal interfaces provided by seals 55, 80 and 108. The seals 55, 80, and 108 are exposed to the open interior of the motor cavity 50 and thus are subject to the environmental conditions therein, including changes in pressure. A radially outer shoulder 110 on the lower end 96 of the tube 94 bottoms out on a radially inner shoulder 112 in the cylindrical stack 106 when the threaded connection 104 is fully engaged. The outer diameter of the tube 94 at the upper end 98 has flat surfaces 115 (see, e.g., FIG. 3) for engagement by a manual tool during installation, in particular for rotating the upper end 98 of the tube 94 relative to the motor housing 42 so as to complete the threaded connection 104.

Figure 2:
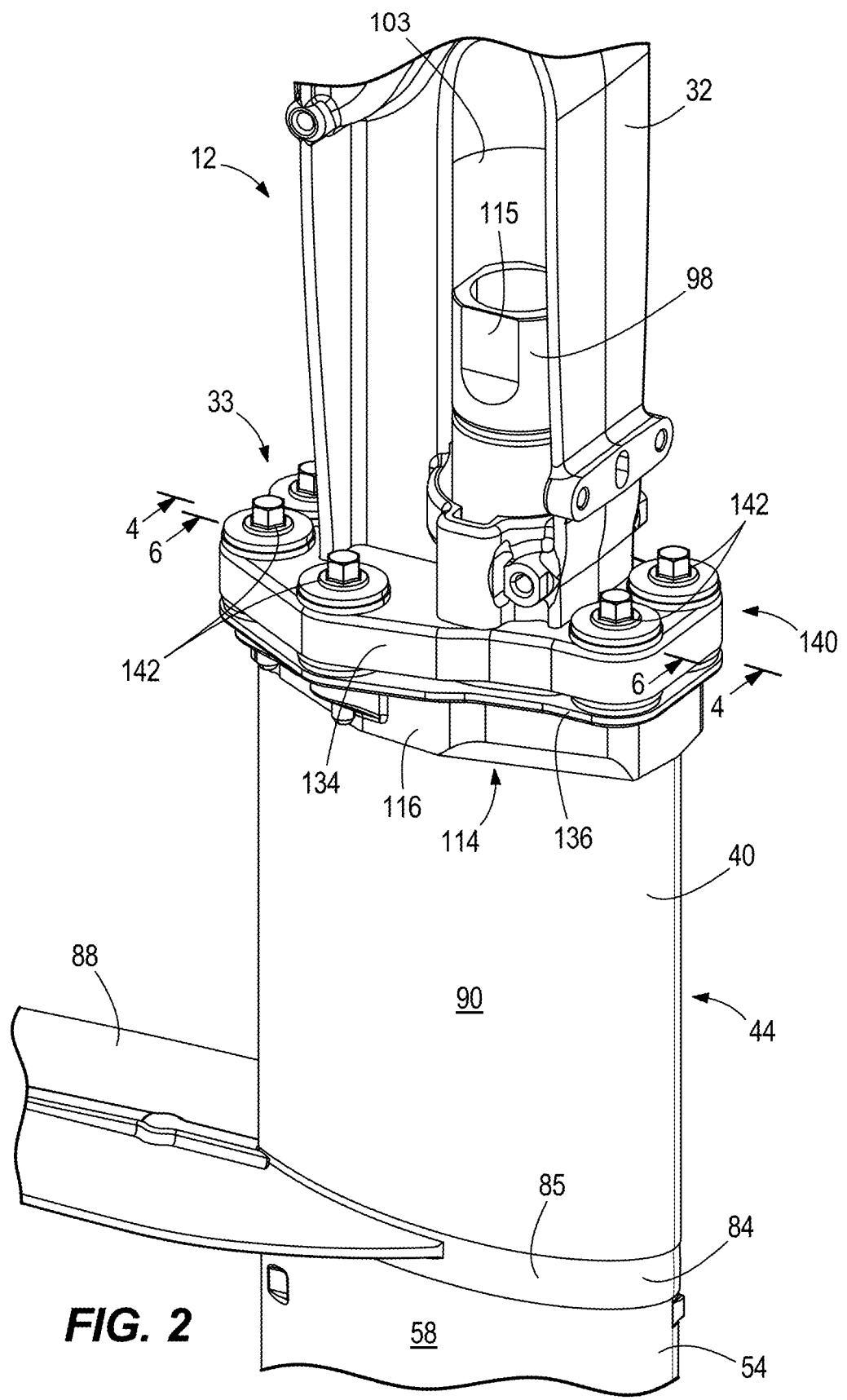
FIG. 2 is a closer view of the marine drive, showing portions of a supporting frame configured to support the marine drive with respect to the marine vessel, an extension leg depending on the supporting frame, and a vibration isolating joint which couples the extension leg to the supporting frame.
Figure 3:
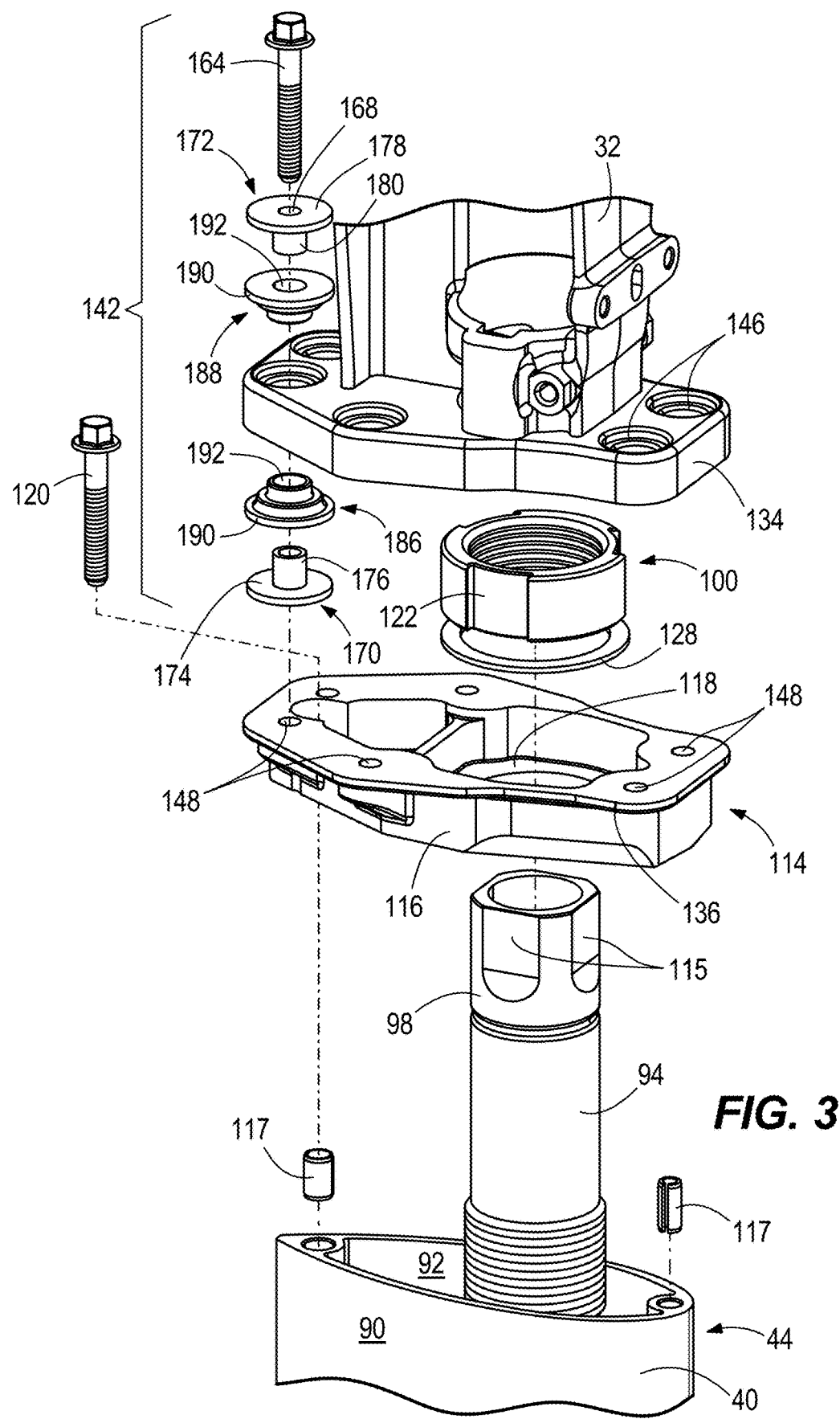
FIG. 3 is an exploded view of what is shown in FIG. 2.
Figure 5:
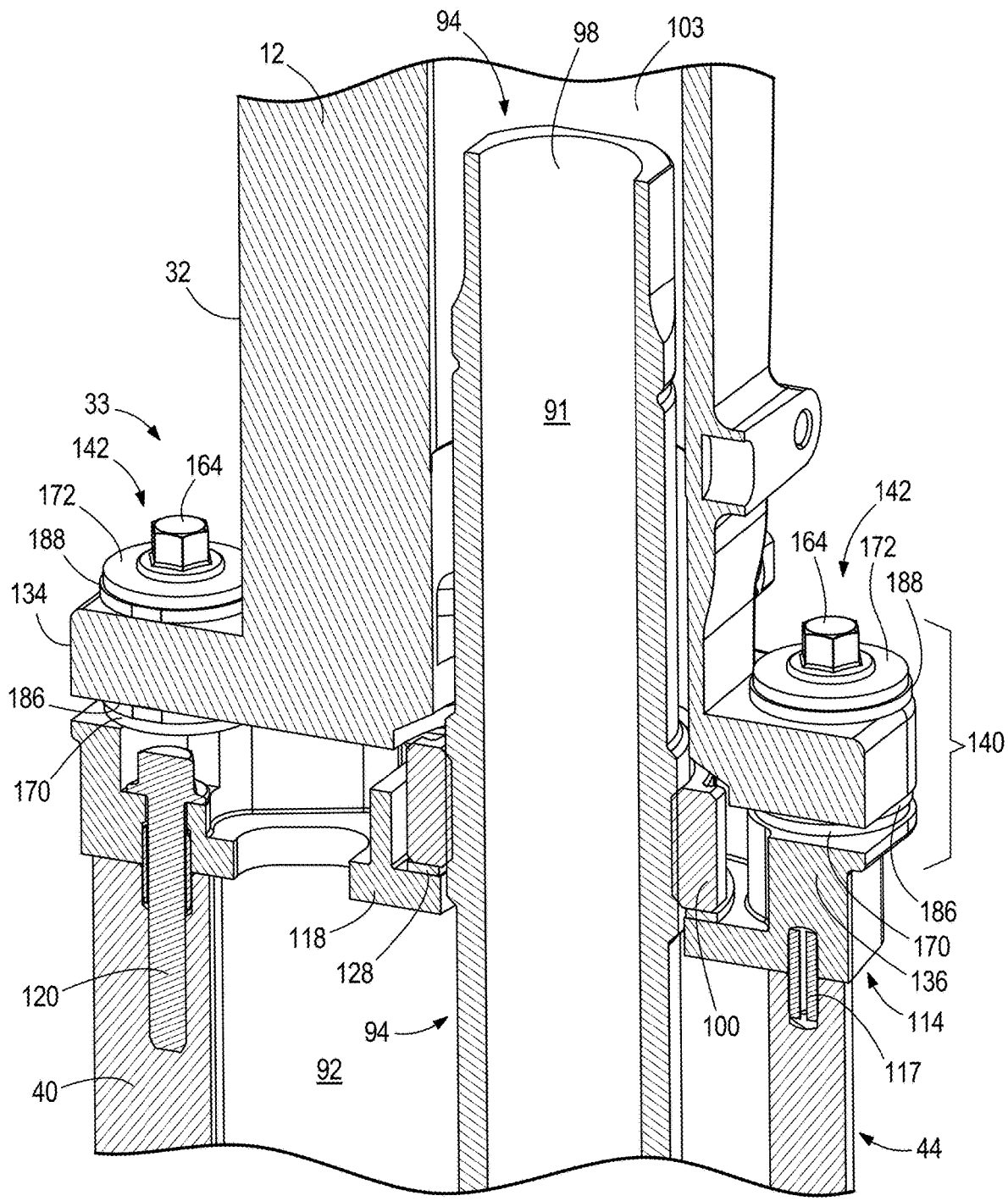
FIG. 5 is another sectional view of the vibration isolating joint.

Referring to FIGS. 3-5, the extension leg 44 includes an adapter plate 114 which is fastened to the upper end of the elongated body 40. The adapter plate 114 has a perimeter sidewall 116 and an interior abutment surface 118 which laterally and longitudinally extends between the tube 94 and the inner diameter of the perimeter sidewall 116 of the adapter plate 114. The interior abutment surface 118 extends entirely around the tube 94. As best seen in FIG. 2, the upper end 98 of the tube 94 axially extends out of the hollow interior 92 of the extension leg 44, through a hole in the interior abutment surface 118, and protrudes into an interior passage 103 of the supporting frame 12. The adapter plate 114 includes leg mounting flange 136 which extends from and around the perimeter of the perimeter sidewall 116 at a top side of the adapter plate 114. Pins 117 register and maintain the adapter plate 114 in alignment with extension leg 44. The pins 117 extend into bores formed in the perimeter sidewall 116 of the adapter plate 114 and into corresponding bores formed in the perimeter sidewall 90 of the upper end of the extension leg 44. Additionally or alternatively, a fastener 120 may extend through at least one set of said corresponding bores to fasten the adapter plate 114 to the elongated body 40.

The compression nut 100 is engaged with the upper end 98 of the tube 94 via a threaded connection 124, and particularly so as to clamp the extension leg 44 in place between the supporting frame 12 and the motor housing 42, thereby providing increased overall load carrying capability compared to the prior art and advantageously avoiding the use of fasteners which are visible from the exterior of the lower unit 34. As best seen in FIG. 3, the inner diameter of the compression nut 100 has threads for engaging corresponding threads on the upper end 98 of the tube 94. Flats 122 are disposed around the outer perimeter of the compression nut 100 for engagement by a manual tool for rotating the compression nut 100 about the tube 94.

To assemble the lower unit, a washer 128 and the compression nut 100 are slid onto the upper end 98 of the tube 94 until the threads abut. The compression nut 100 is then rotated by a wrench in a direction which causes the compression nut 100 to travel downwardly along the tube 94, via engagement between the threads. Continued rotation of the compression nut 100 moves it into compressing engagement with the top of the interior abutment surface 118. Compression of the compression nut 100 applies a corresponding clamping force on the adapter plate 114, which pulls the tube 94 and motor housing 42 axially upwardly. This firmly compresses and clamps the head 84 of the anti-ventilation plate 47 and the extension leg 44 between the motor housing 42 and bottom of the adapter plate 114 without the need for external fasteners and in an improved load-bearing arrangement. Advantageously the entire arrangement can be easily assembled in an efficient manner and with minimal externally visible fasteners.

Referring to FIGS. 2 and 3, the lower end 33 of the supporting frame 12 has a frame mounting flange 134 which extends from and around the perimeter of the support leg 32 at a bottom end of the support leg 32. The extension leg 44 includes a leg mounting flange 136 positioned at the upper end thereof. As previously discussed, the leg mounting flange 136 is included on the adapter plate 114 in the illustrated embodiments. Other embodiments, however, may include an extension leg with an integrally formed leg mounting flange. A radially outer profile of the leg mounting flange 136 generally matches the radially outer profile of the frame mounting flange 134. A plurality of bores 146 are formed through the frame mounting flange 134, and each bore 146 in the frame mounting flange 134 is arranged in vertical axial alignment with a corresponding bore 148 formed through the leg mounting flange 136. In the non-limiting illustrated embodiments, the bores 146 in the frame mounting flange 134 are configured as double counterbored holes 146. That is, the bores 146 in the frame mounting flange 134 are counterbored from both sides so that an annular ring 150 having an upper surface 152 and a lower surface 154 is formed around the interior diameter of the bores 146 (see, e.g., FIG. 7). In other embodiments, at least one of the bores 148 formed through the leg mounting flange 136 may be configured as a counterbored hole, and/or at least one bore 146 in the frame mounting flange 134 may not be a counterbored hole.

As is described in further detail herein below, the novel vibration isolating joint 140 couples the frame mounting flange 134 and the leg mounting flange 136, thereby coupling the extension leg 44 to the supporting frame 12. The vibration isolating joint 140 includes a plurality of isolating connector assemblies 142 spaced apart around the frame mounting flange 134 and the leg mounting flange 136. Each isolating connector assembly 142 engages one of the counterbored holes 146 in the frame mounting flange 134 and the corresponding one of the bores 148 in the leg mounting flange 136. In the non-limiting embodiment of FIG. 2, the vibration isolating joint 140 includes six isolating connector assemblies 142. Other embodiments may include a different number of isolating connector assemblies 142, and/or at least one isolating connector assembly 142 may be arranged in a different position than those of the illustrated embodiments.

Figure 6:
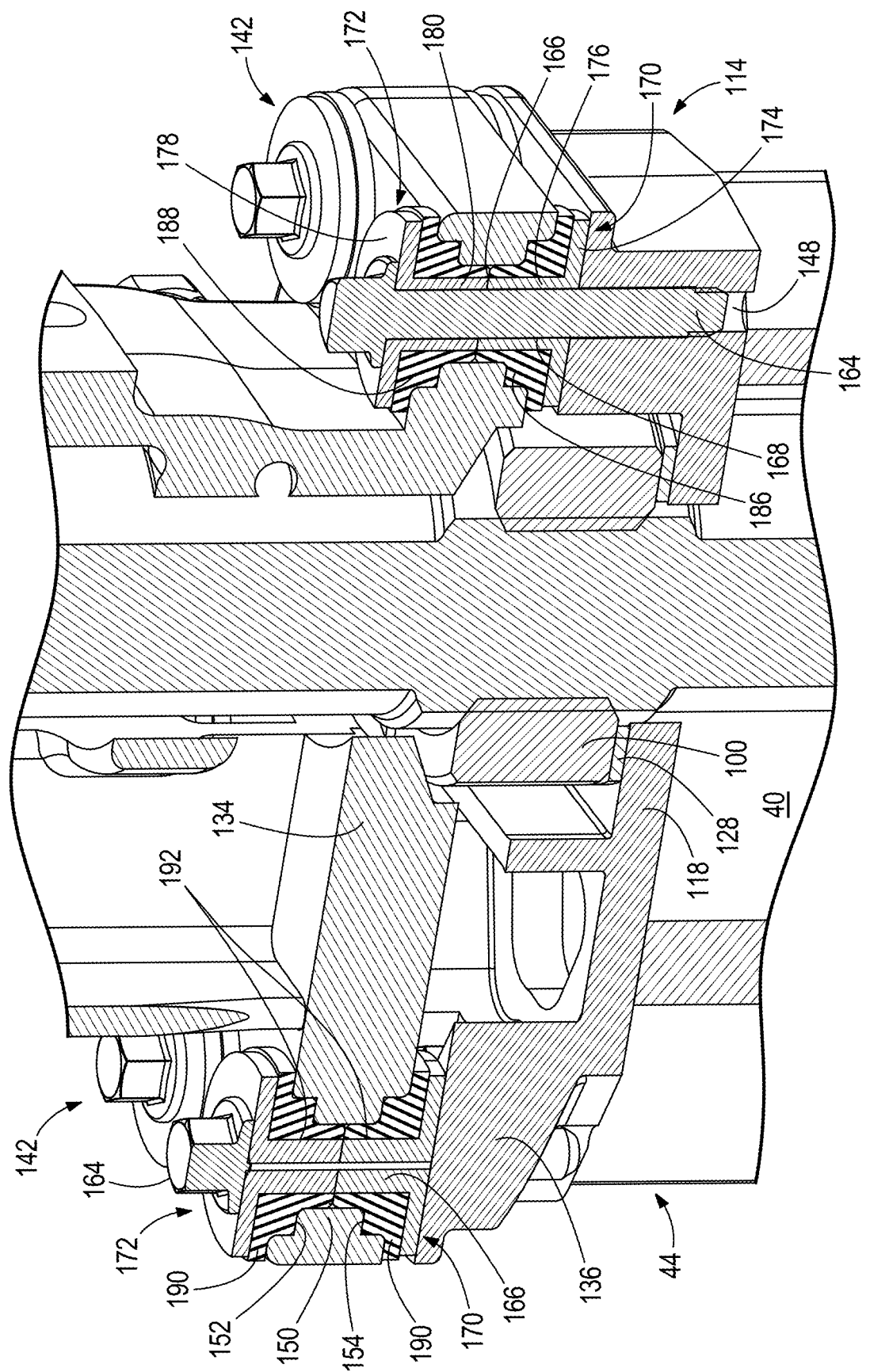
FIG. 6 is a view of Section 6-6, taken in FIG. 2.
Figure 7:
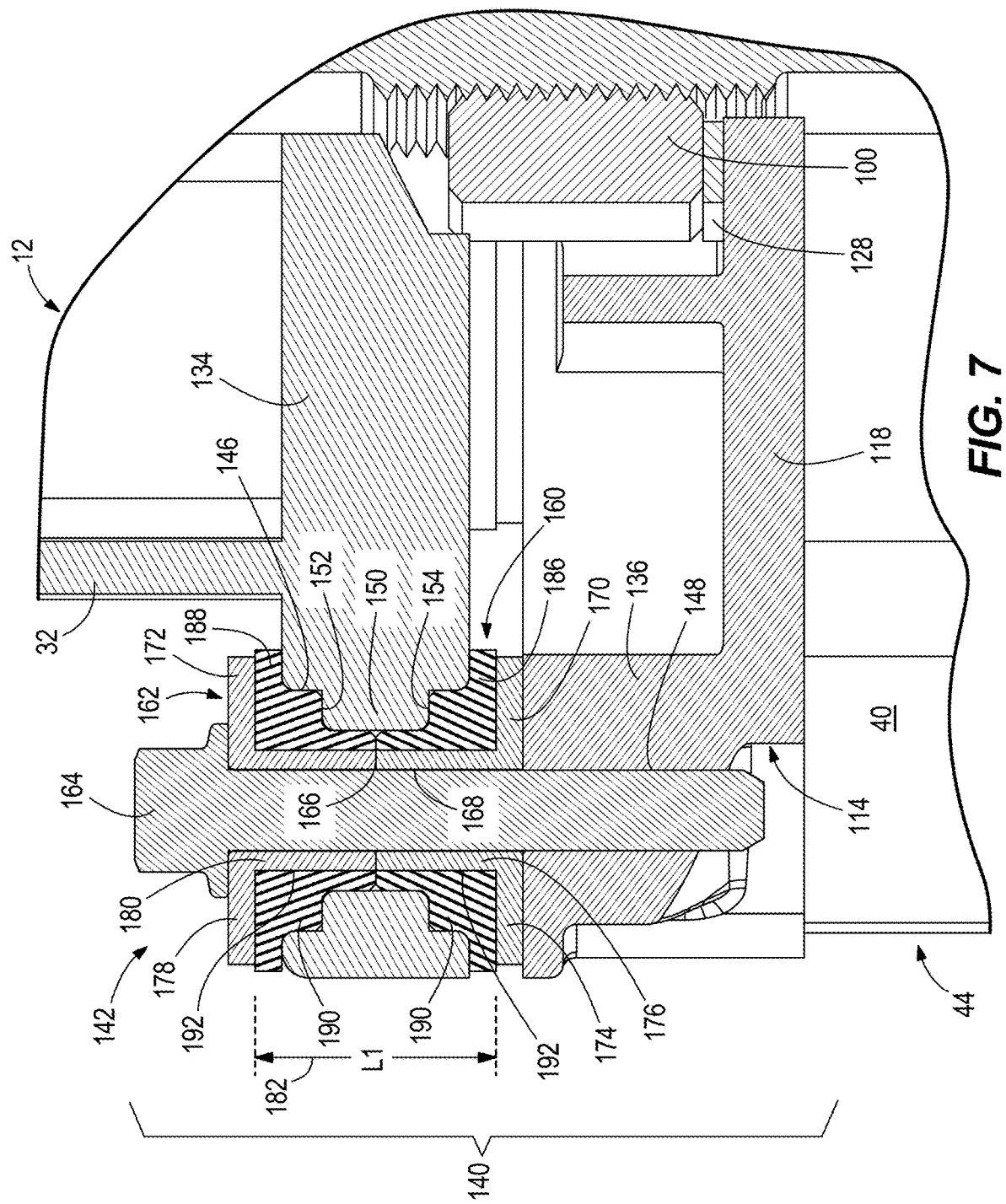
FIG. 7 is a closer view of a portion of Section 6-6.

Referring to FIGS. 3, 6, and 7, each isolating connector assembly 142 includes an elastomeric member 160, a compression limiter 162, and a fastener 164. The fastener 164 extends through the elastomeric member 160 and the compression limiter 162 and couples the frame mounting flange 134 and the leg mounting flange 136 together. The compression limiters 162 are rigid members having a rigid cylinder 166 with a bore 168 through which the fastener 164 extends. In the non-limiting illustrated embodiments, the compression limiters 162 include a first limiter portion 170 and a second limiter portion 172. The first limiter portion 170 includes a first annular flange 174 and a first cylinder half 176 and is located between the leg mounting flange 136 of the extension leg 44 and the frame mounting flange 134 of the supporting frame 12. The second limiter portion 172 includes a second annular flange 178 and a second cylinder half 180 and is located on an opposite side of the leg mounting flange 136 of the extension leg 44. The first limiter portion 170 and the second limiter portion 172 oppose each other such that the first and second cylinder halves 176, 180 abut each other to form the rigid cylinder 166. Together, the first limiter portion 170 and second limiter portion 172 define an axial space 182 between the first and second annular flanges 174, 178 in which elastomeric member 160 is located, as illustrated in FIGS. 6 and 7.

The elastomeric member 160 has a first resilient portion 186 located between the leg mounting flange 136 and the frame mounting flange 134 and a second resilient portion 188 located on an opposite side of the frame mounting flange 134 relative to the first resilient portion 186. The first resilient portions 186 and the second resilient portions 188 are configured to be received in the counterbored holes 146. Referring to FIGS. 6 and 7, an annular flange 190 of the first resilient portion 186 abuts the lower surface 154 of the annular ring 150 and an annular flange 190 of the second resilient portion 188 abuts the upper surface 152 of the annular ring 150. The first and second resilient portions 186, 188 each include a bore 192 configured to respectively receive the first and second cylinder halves 176, 180 of the first and second limiter portions 170, 172. When assembled, the first resilient portion 186 is located between the first limiter portion 170 and the frame mounting flange 134 of the supporting frame 12 and the second resilient portion 188 is located between the second limiter portion 172 and the frame mounting flange 134 of the supporting frame 12. Thus, the elastomeric member 160 is clamped in the axial space 182 between first annular flange 174 and the second annular flange 178.

Referring to FIGS. 6 and 7, to assemble the vibration isolating joint 140 and couple the supporting frame 12 to the lower unit 34, the elastomeric members 160 are inserted into the counterbored holes 146 by placing the first resilient portions 186 in a bottom opening of a counterbored hole 146 and the second resilient portion 188 in a top opening of said counterbored hole 146. The compression limiters 162 are then received in the elastomeric members 160 by inserting the first cylinder halves 176 into the bores 192 of the first resilient portions 186 and the second cylinder halves 180 into the bores 192 of the second resilient portions 188. The fasteners 164 are then inserted into the elastomeric members 160 and the compression limiters 162 so that the fasteners 164 extend through the first limiter portion 170, the first resilient portion 186, the second limiter portion 172, and the second resilient portion 188. The fasteners 164 extend through the elastomeric members 160 and the compression limiters 162 to engage the bore 148 formed in the leg mounting flange 136.

Tightening the fasteners 164 clamps the elastomeric members 160 between the extension leg 44 and the supporting frame 12 until engagement between the fasteners 164 and the compression limiters 162 prevents further tightening of the fasteners 164. In the non-limiting illustrated embodiments, tightening of the fastener 164 clamps the first resilient portion 186 between the first limiter portion 170 of the compression limiter 162 and the frame mounting flange 134, and the second resilient portion 188 is clamped between the second limiter portion 172 and the frame mounting flange 134. The axial space 182 between the first and second annular flanges 174, 178 of the compression limiters 162 has a length L1 which is preselected to prevent over compression of the elastomeric member 160 by the fastener 164. Thus, the compression limiters 162 prevent over tightening of the fasteners 164 to prevent over compression of the elastomeric member 160. The elastomeric members 160, which are clamped between the extension leg 44 and the supporting frame 12, advantageously limit the transfer of vibrations from the extension leg 44 to the supporting frame 12. All vibrations emanating from the electric motor are transferred to the elastomeric member 160 before being transferred to the supporting frame 12, thereby reducing problematic noise and increasing overall noise quality. The compression limiters 162 prevent over clamping of the elastomeric member during assembly of the extension leg 44 and the motor housing 42. By limiting compression of the elastomeric members 169, a predetermined pressure can be loaded onto the elastomeric members. The predetermined load may be selected to limit the transmission of undesirable sound frequencies through the elastomeric members 160 while still supporting the loads needed for propulsion. This may be useful, for example, in order to lower aquatic noise levels to produce less disturbance to boaters, inhabitants, and/or wildlife.

In the non-limiting illustrated embodiments, the isolating connector assemblies 142 are configured so that the elastomeric members 160 are clamped between the first and second annular flanges 174, 178 of the compression limiters 162 and the frame mounting flange 134. Other embodiments, however, may be differently configured. For example, a vibration isolating joint may include at least one connector assembly configured to clamp an elastomeric member between a compression limiter and the leg mounting flange. In such an embodiment, the first resilient portion may be clamped between first annular flange of the first limiter portion and the leg mounting flange and the second resilient portion may be clamped between second annular flange of the second limiter portion and the leg mounting flange.

While embodiments of a marine drive 10 illustrated in FIGS. 1-7 include a vibration isolating joint 140 coupling the supporting frame 12 to the extension leg 44, some embodiments can additionally or alternatively include at least one vibration isolating joint arranged at a different location on a marine drive. For example, FIGS. 8-12 depict an example of the lower unit 204 of a marine drive which generally includes a motor housing 202, an extension leg 212, and a vibration isolating joint 240 which couples the extension leg 212 to the motor housing 202. The extension leg 212 depends on a support frame (see, e.g., FIGS. 1 and 2), and the motor housing 202 depends on the extension leg 212. The motor housing 202 has a front housing portion 214 and a rear housing portion 216 that are coupled by another vibration isolating joint 340. The front housing portion 214 and the rear housing portion 216 define a motor cavity 218 for containing an electric motor 220 (see, e.g., FIGS. 11 and 12) and related componentry, which otherwise defines a generally open space that is devoid of fluid.

Figure 8:
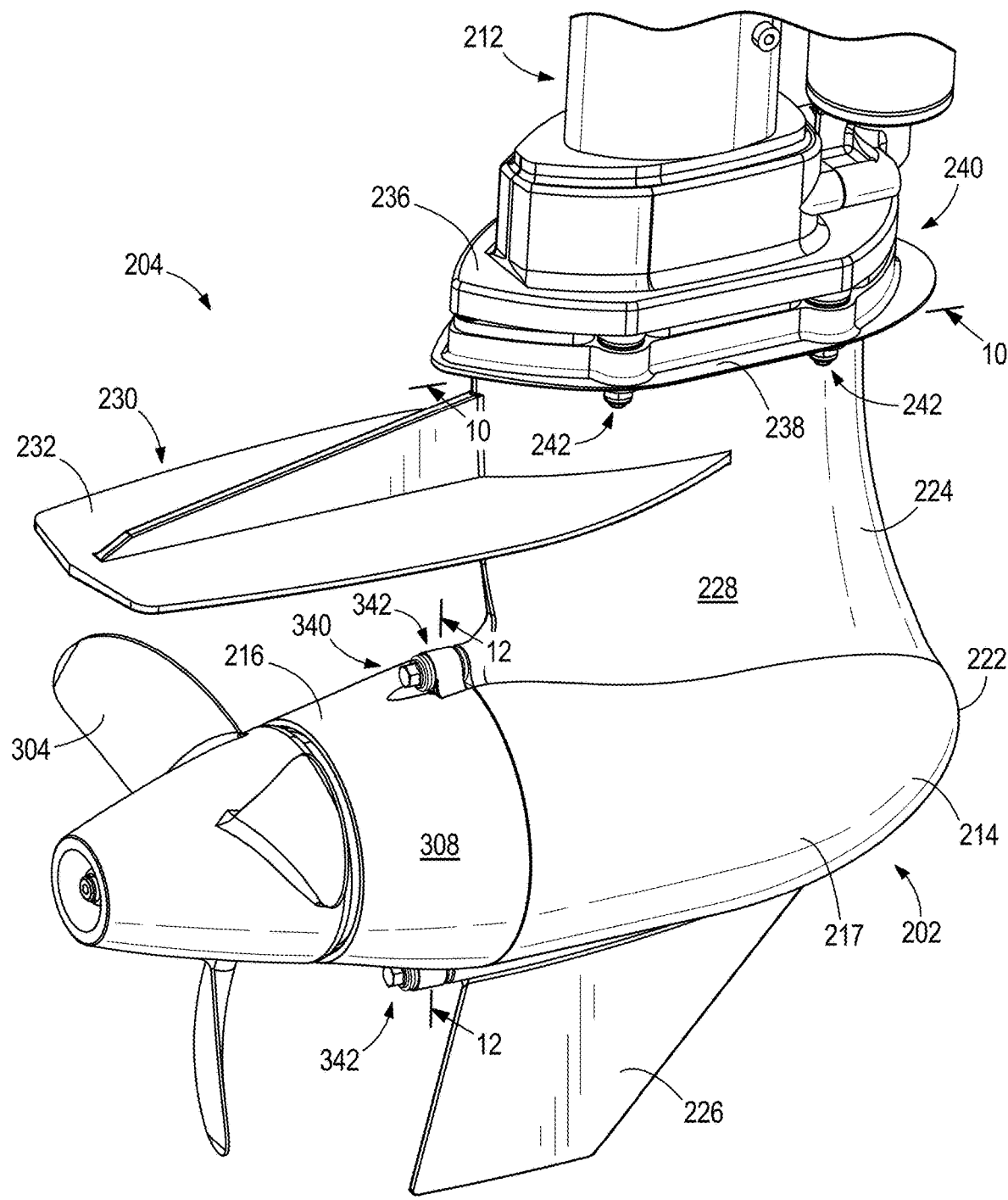
FIG. 8 is a perspective view of a lower unit of a second embodiment of a marine drive, showing portions of an extension leg, a motor housing depending on the extension leg, and a vibration isolating joint which couples the extension leg to the motor housing.
Figure 9:
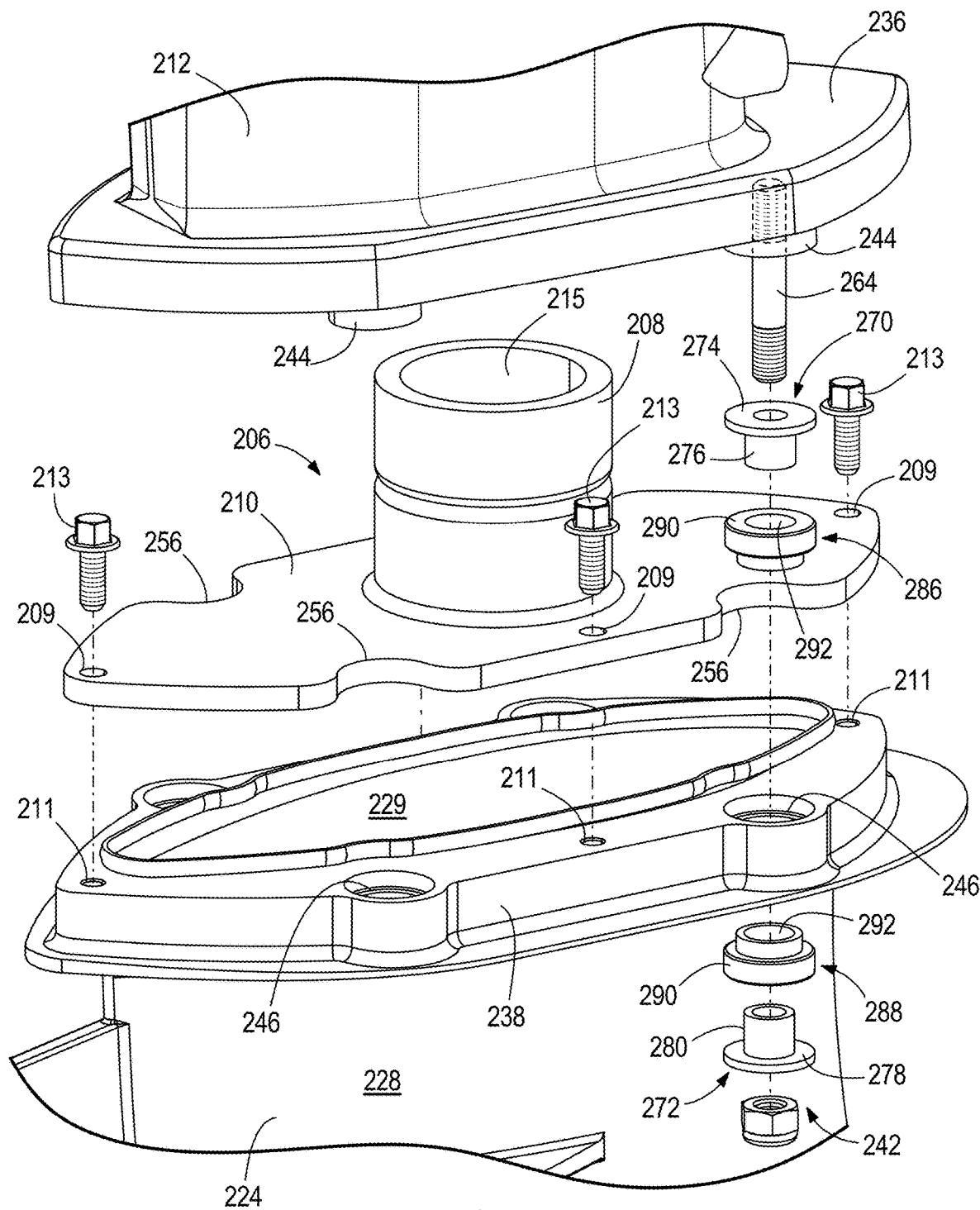
FIG. 9 is an exploded view of what is shown in FIG. 8.

Referring to FIGS. 8-9, the front housing portion 214 has a nosecone 222 with a smooth outer surface which transitions to an upwardly extending stem 224 and a downwardly extending skeg 226. The stem 224 has a perimeter sidewall 228, which defines a hollow interior 229 and may be monolithic or made of multiple pieces. An anti-ventilation plate 230 is positioned between an upper end and a lower end of the stem 224 and includes a flat tail 232 that extends rearwardly from the perimeter sidewall 228. In the non-limiting embodiments of FIGS. 8-12, the anti-ventilation plate 230 is integrally formed with the stem 224. Some embodiments, however, may include an anti-ventilation plate 230 that is separate from the stem 224 and secured to at least one part of the lower unit (see, e.g., FIGS. 1 and 4). The motor housing 202 includes a cover plate 206 with a cylindrical stack 208 and a cover plate flange 210, which extends from and around the lower end of the cylindrical stack 208. A plurality of bores 209 are formed through the cover plate flange 210, and each bore 209 in the cover plate flange 210 is arranged in vertical axial alignment with a corresponding bore 211 formed in the motor housing mounting flange 238. A fastener 213 extends through each of the bores 209 in the cover plate flange 210 and into threaded engagement with the corresponding one of the bores 211 in the motor housing mounting flange 238 to couple the cover plate 206 to the stem 224. A bore 215 formed in the cylindrical stack may be configured to receive a rigid conduit portion or tube (not shown) that extends from the support frame to the motor housing 202 (see, e.g., 4) such that the cover plate 206 seals the opening into the hollow interior 229 of the stem 224, thereby preventing ingress of water into the motor housing 202.

An upper end of the motor housing 202 includes a motor housing mounting flange 238 which extends from and around the perimeter sidewall 228 of the stem 224 at an upper end of the stem 224. A radially outer profile of the motor housing mounting flange 238 generally matches the radially outer profile of a leg mounting flange 236 at a lower end of the extension leg 212. The leg mounting flange 236, which extends from and around the perimeter of the extension leg 212, includes a plurality of downwardly extending protrusions 244. A bore 248 is formed into each of the protrusions 244, and each bore 248 in the leg mounting flange 236 is arranged in vertical axial alignment with a corresponding bore 246 formed through the motor housing mounting flange 238. In the non-limiting illustrated embodiments, the bores 246 in the motor housing mounting flange 238 are configured as double counterbored holes 146 so that an annular ring 250 having an upper surface and a lower surface is formed around the interior diameter of the bores 246 (see, e.g., FIG. 10). In other embodiments, however, at least one bore 246 in the motor housing mounting flange 238 may not be a counterbored hole.

As is described in further detail herein below, the vibration isolating joint 240 couples the leg mounting flange 236 and the motor housing mounting flange 238, thereby coupling the extension leg 212 to the motor housing 202. The vibration isolating joint 240 includes a plurality of isolating connector assemblies 242 spaced apart around the leg mounting flange 236 and the motor housing mounting flange 238. Each isolating connector assembly 242 engages one of the counterbored holes 246 in the motor housing mounting flange 238 and the corresponding one of the bores 248 in the protrusions 244 of the leg mounting flange 236. A plurality of cutouts 256 are formed into the sides of the cover plate flange 210, and each cutout 256 is aligned with a corresponding one of the isolating connector assemblies 242. A portion of the protrusions 244 and/or a portion of the connector assemblies 242 extend through the cutouts 256 so that the connector assemblies 242 extend between the leg mounting flange 236 and the motor housing mounting flange 238 without engaging the cover plate 206. In the non-limiting embodiment of FIG. 9, the vibration isolating joint 240 includes four isolating connector assemblies 242. Other embodiments may include a different number of isolating connector assemblies 242, and/or at least one isolating connector assembly 242 may be arranged in a different position than those of the illustrated embodiments. Further still, some embodiments may include at least one connector assembly that is configured to engage part of the cover plate.

Figure 10:
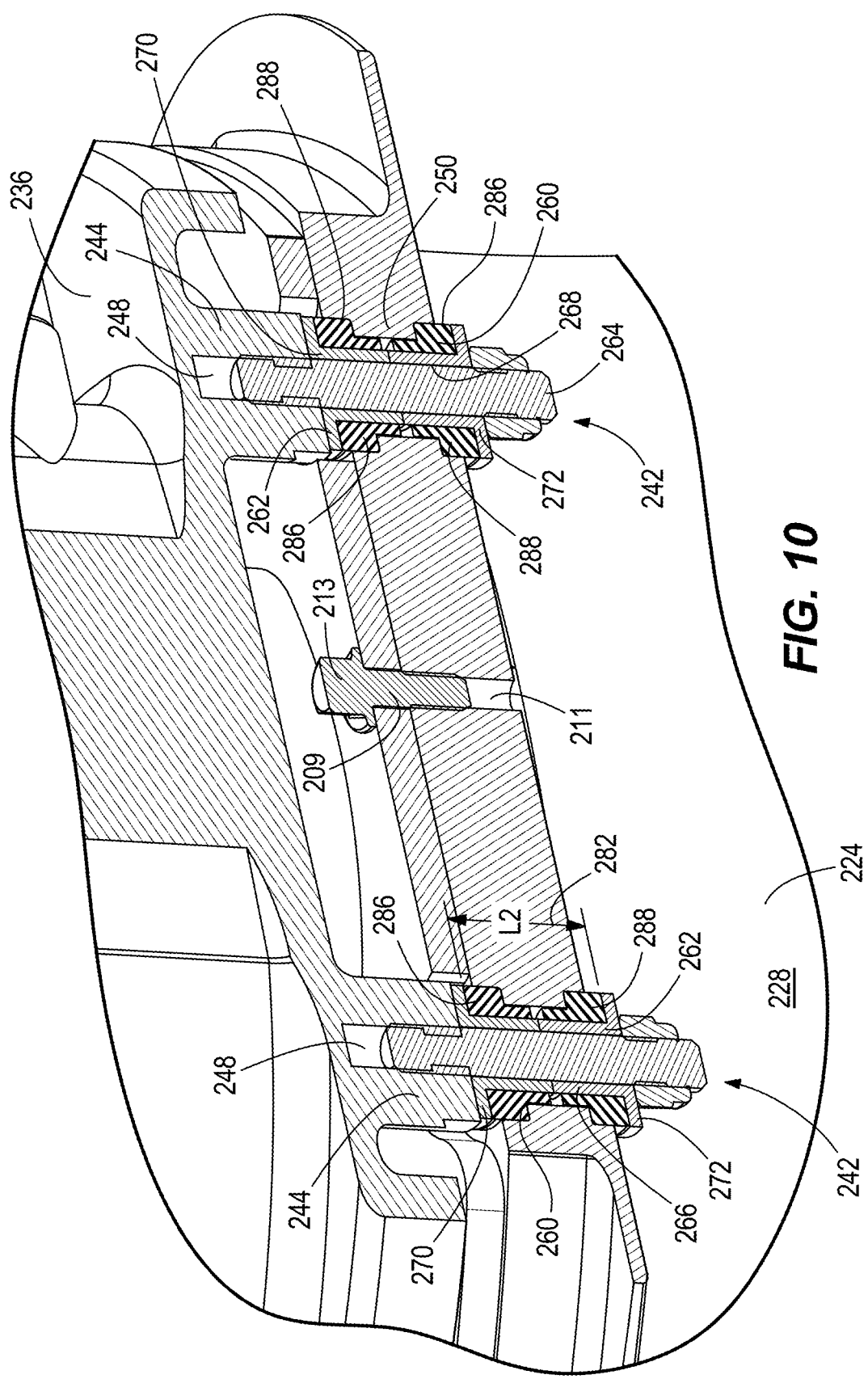
FIG. 10 is a view of Section 10-10, taken in FIG. 8.

Referring to FIGS. 9 and 10, each isolating connector assembly 242 includes an elastomeric member 260, a compression limiter 262, and a fastener 264. The fastener 264 extends through the elastomeric member 260 and the compression limiter 262 and couples the leg mounting flange 236 and the motor housing mounting flange 238 together. The compression limiters 262 are rigid members that each have a rigid cylinder 266 with a bore 268 through which the fastener 264 extends.

Similarly to the vibration isolating joint 140 of FIGS. 1-7, the compression limiters 262 include a first limiter portion 270 with a first annular flange 274 and a first cylinder half 276 and a second limiter portion 272 with a second annular flange 278 and a second cylinder half 280. The first limiter portion 270 is located between the leg mounting flange 236 of the extension leg 212 and the motor housing mounting flange 238 of the motor housing 202. The second limiter portion 272 is located on an opposite side of the motor housing mounting flange 238 of the motor housing 202. The first limiter portion 270 and the second limiter portion 272 oppose each other such that the first and second cylinder halves 276, 280 abut each other to form the rigid cylinder 266. Together, the first limiter portion 270 and second limiter portion 272 define an axial space 282 between the first and second annular flanges 274, 278 in which elastomeric member 260 is located, as illustrated in FIG. 10.

The elastomeric members 260 each have a first resilient portion 286 located between the leg mounting flange 236 and the motor housing mounting flange 238 and a second resilient portion 288 is located on an opposite side of the motor housing mounting flange 238 relative to the first resilient portion 286. The first resilient portions 286 and the second resilient portions 288 are configured to be received in the counterbored holes 246. Referring to FIG. 10, an annular flange 290 of the first resilient portion 286 abuts the upper surface of the annular ring 250 and an annular flange 290 of the second resilient portion 288 abuts the lower surface of the annular ring 250. The first and second resilient portions 286, 288 each include a bore 292 configured to respectively receive the first and second cylinder halves 276, 280 of the first and second limiter portions 270, 272. When assembled, the first resilient portion 286 is located between the first limiter portion 270 and the motor housing mounting flange 238 of the motor housing 202 and the second resilient portion 288 is located between the second limiter portion 272 and the motor housing mounting flange 238 of the motor housing 202. Thus, the elastomeric member 260 is clamped in the axial space 282 between first annular flange 274 and the second annular flange 278.

With continued reference to FIGS. 9 and 10, to assemble the vibration isolating joint 240 and couple the extension leg 212 to the motor housing 202, the elastomeric members 260 are inserted into the counterbored holes 246 by placing the first resilient portions 286 in a top opening of a counterbored hole 246 and the second resilient portion 288 in a bottom opening of said counterbored hole 246. The compression limiters 262 are then received in the elastomeric members 260 by inserting the first cylinder halves 276 into the bores 292 of the first resilient portions 286 and the second cylinder halves 280 into the bores 292 of the second resilient portions 288. The fasteners 264 are then inserted into the elastomeric members 260 and the compression limiters 262 so that the fasteners 264 extend through the first limiter portions 270, the first resilient portions 286, the second limiter portions 272, and the second resilient portions 288. In the non-limiting embodiments of FIGS. 8-10, the fasteners 64 are configured as threaded dowels with corresponding bolts. Each threaded dowel extends between a first threaded end and a second threaded end. The threaded dowels extend through the elastomeric members 260 and the compression limiters 262 so that a first end of the threaded dowel threadedly engages the bores 248 formed in the protrusions 244 of the leg mounting flange 236. The second threaded end extends past a lower surface of the motor housing mounting flange 238 and is configured to receive a nut, which can be tightened to couple the motor housing 202 to the extension leg 212. Other embodiments, however, may include at least on fastener configured as a bolt and/or another type of fastener.

Tightening the fasteners 264 clamps the elastomeric members 260 between the extension leg 212 and the motor housing 202 until engagement between the fasteners 264 and the compression limiters 262 prevents further tightening of the fasteners 264. In the non-limiting illustrated embodiments, tightening of the fasteners 264 clamps the first resilient portions 286 between the first limiter portions 270 of the compression limiters 262 and the motor housing mounting flange 238 and the second resilient portion 288 between the second limiter portion 272 and the motor housing mounting flange 238. The axial space 282 between the first and second annular flanges 274, 278 of the compression limiters 262 has a length L2 which is preselected to prevent over compression of the elastomeric member 260 by the fastener 264. Thus, the compression limiters 262 prevent over tightening of the fasteners 264 to thereby prevent over compression of the elastomeric member 260. The elastomeric members 260, which are clamped between the extension leg 212 and the motor housing 202, advantageously limit the transfer of vibrations from the motor housing 202 to the extension leg 212. All vibrations emanating from the electric motor are transferred to the elastomeric members 260 before being transferred to the extension leg 212. Because the vibration isolating joint 240 is positioned below the waterline when the marine drive 10 is in operation, the intensity of the vibrations is reduced before traveling into a component that is exposed to open air. This may be particularly useful in reducing problematic noise and increasing overall noise quality of the marine drive. The compression limiters 262 prevent over clamping of the elastomeric member during assembly of the extension leg 212 and the motor housing 202. By limiting compression of the elastomeric members 260, a predetermined pressure can be loaded onto the elastomeric members 260. The predetermined load may be selected to limit the transmission of undesirable sound frequencies through the elastomeric members. In some embodiments, the vibration isolating joint 240 between the motor housing 202 and the extension leg 212 may be configured to limit the transmission of specific frequencies that may be prone to causing undesirable noise when a vibrating component is exposed to open air.

In the non-limiting illustrated embodiments, the isolating connector assemblies 242 are configured so that the elastomeric members 260 are clamped between the annular flanges 274, 278 of the compression limiters 262 and the motor housing mounting flange 238. Other embodiments, however, may be differently configured. For example, a vibration isolating joint may include at least one connector assembly configured to clamp an elastomeric member between a compression limiter and the leg mounting flange. In such an embodiment, the first resilient portion may be clamped between first annular flange of the first limiter portion and the leg mounting flange and the second resilient portion may be clamped between second annular flange of the second limiter portion and the leg mounting flange.

Some embodiments of a marine drive may include a motor housing with a vibration isolating joint which couples a first housing portion of the motor housing to a second housing portion of the motor housing. For example, referring to FIGS. 8, 11 and 12, the motor housing 202 includes a vibration isolating joint 340 which couples the front housing portion 214 to the rear housing portion 216. The motor housing 202 generally includes front housing portion 214 and a rear housing portion 216 nested in the front housing portion 214. The front housing portion 214 and the rear housing portion 216 together define a torpedo housing 217 and a motor cavity 218 for containing an electric motor 220 and related componentry. The electric motor 220 is nested within the rear housing portion 216 and is configured to cause rotation of an output shaft 302 extending from the rear housing portion 216. A propulsor 304 is coupled to the output shaft 302 so that rotation of the output shaft 302 causes rotation of the propulsor 304.

Figure 11:
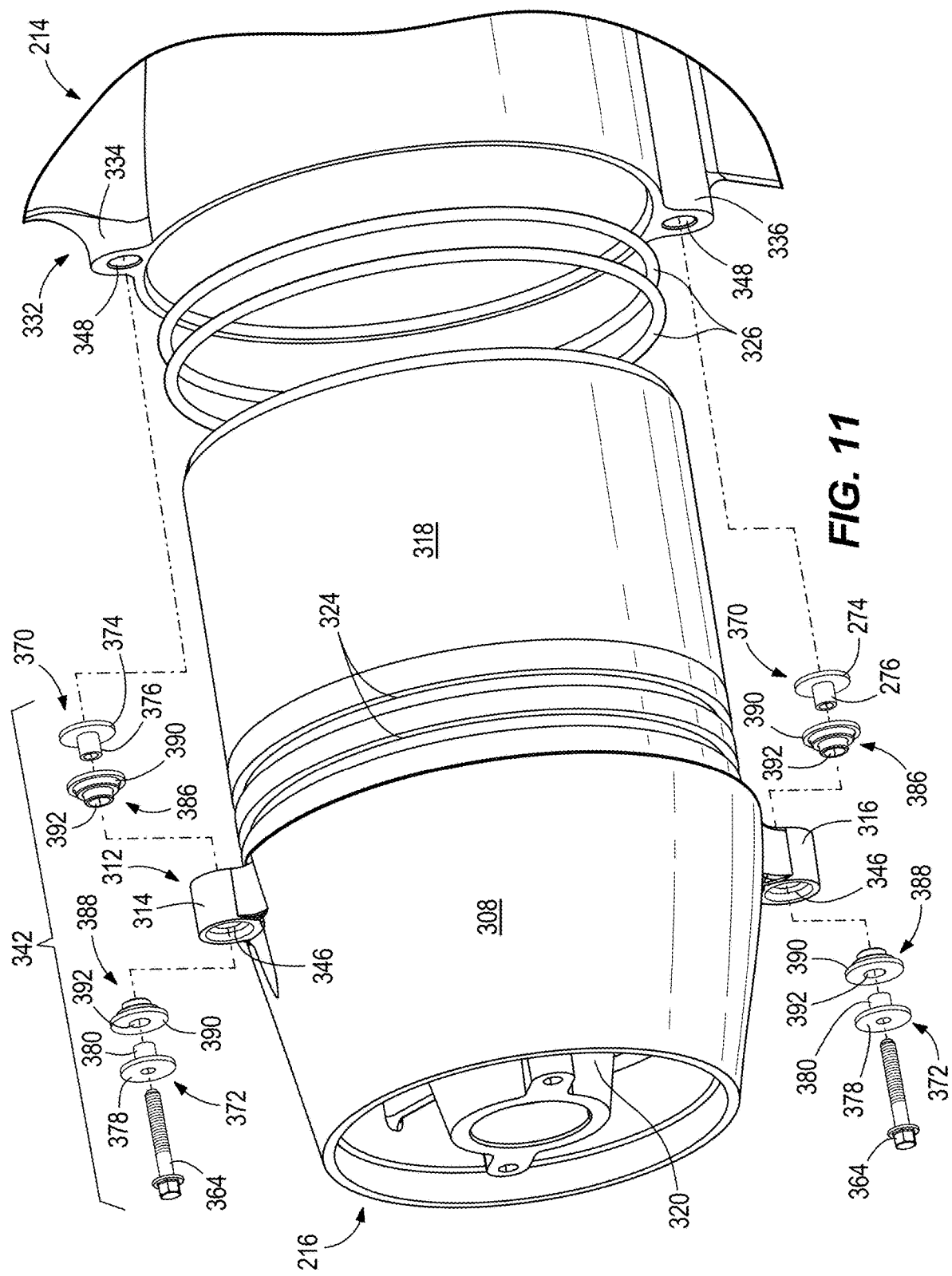
FIG. 11 is an exploded view of the motor housing of FIG. 8, showing a rear housing portion, portions of a front housing portion, and a vibration isolating joint which couples the front housing portion to the rear housing portion.
Figure 12:
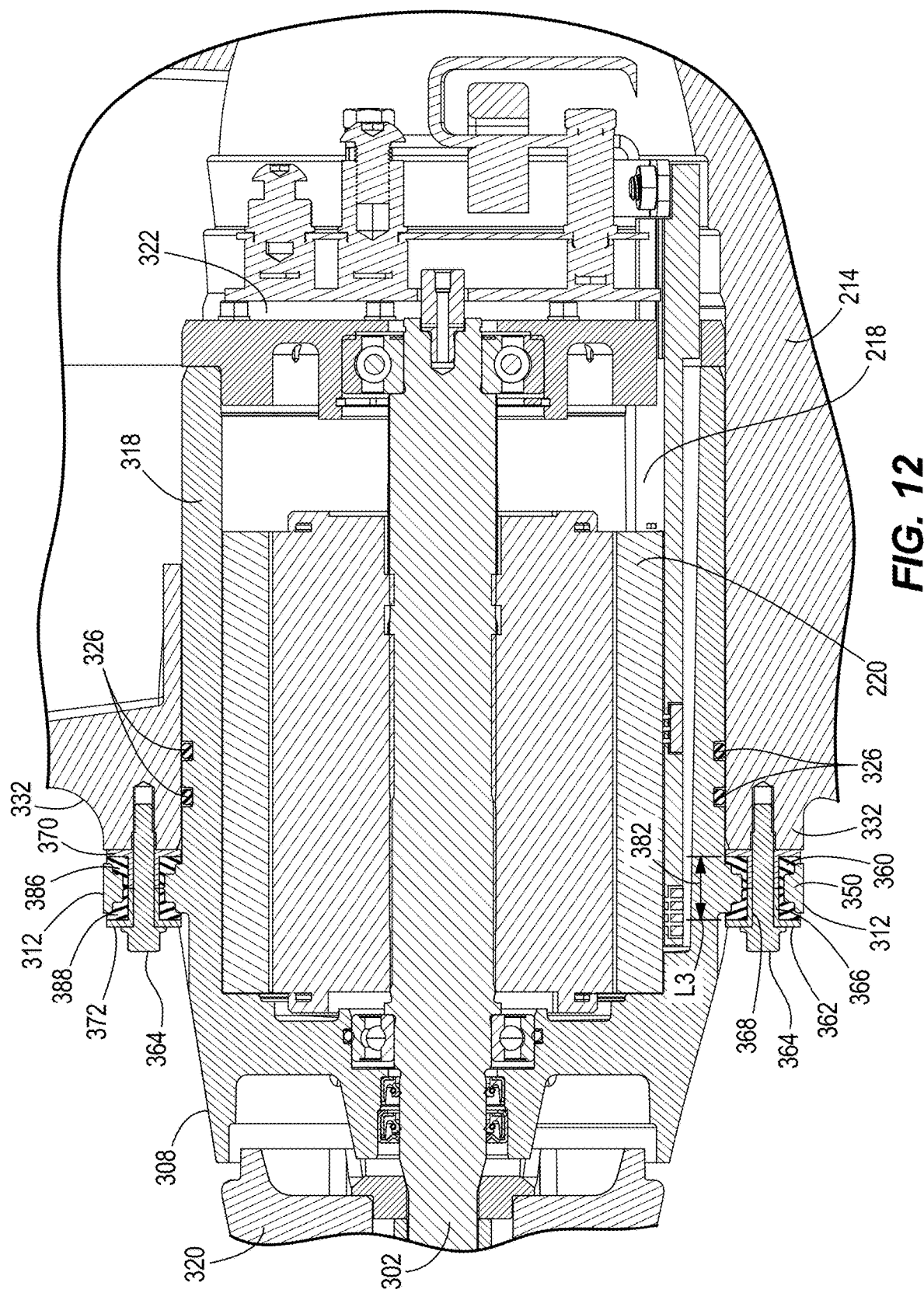
FIG. 12 is a view of Section 12-12, taken in FIG. 8.

Referring to FIGS. 11 and 12, the rear housing portion 216 is generally cylindrical, having an exterior sidewall 308 which smoothly tapers radially inwardly towards its rear end. The rear housing portion 216 has a radially outer mounting flange 312 positioned proximate a forward end of the exterior sidewall 308. The mounting flange 312 includes an upper flange portion 314 extending upwardly from a top side of the exterior sidewall 308 and a lower flange portion 316 extending downwardly from a bottom side of the exterior sidewall 308. A cylindrical motor support portion 318 extends forward from the mounting flange 312. The electric motor 220 is generally cylindrical and is contained within the motor support portion 318 of the rear housing portion 216, in particular being mounted between a rear end cap 320 and a front end wall 322 of the rear housing portion 216. Annular grooves 324 formed around the surface of the motor support portion 318 are configured to receive O-rings 326 to form a seal between the front housing portion 214 and the rear housing portion 216. Annular dynamic seals 328 surround the output shaft 302 and dynamically seal the rear housing portion 216 via the rear end cap 320 to the output shaft 302 and preferably prevents ingress of water to the motor cavity 218.

The front housing portion 214 has a rear-facing annular body portion 330 which receives the motor support portion 318 of the rear housing portion 216 such that an outer surface of the motor support portion 318 abuts an interior surface of the annular body portion 330. The annular body portion 330 of the front housing portion 214 includes a mounting base 332 with an upper base portion 334 and a lower base portion 336 respectively positioned at the top and bottom sides of annular body portion 330. The upper flange portion 314 and the lower flange portion 316 each include bore 346 formed longitudinally through said flange portions 314, 316. The bores 346 in the mounting flange 312 are arranged in axial alignment with a corresponding bore 348 formed through the upper base portion 334 and the lower base portion 336 of the mounting base 332. In the non-limiting illustrated embodiments, the bores 346 in the mounting flange 312 are configured as double counterbored holes 346 so that an annular ring 350 having an front surface and a rear surface is formed around the interior diameter of the bores 346. In other embodiments, however, at least one bore 346 in the mounting flange 312 may not be a counterbored hole.

As is described in further detail herein below, the novel vibration isolating joint 340 couples the mounting flange 312 to the mounting base 332, thereby coupling front housing portion 214 to the rear housing portion 216. In the non-limiting illustrated embodiment, the vibration isolating joint 340 includes two isolating connector assemblies 342 which each engage one of the counterbored holes 346 in the mounting flange 312 and the corresponding one of the bores 348 in the mounting base 332. In particular, the illustrated vibration isolating joint 340 comprises an upper isolating connector assembly 342 that couples the upper flange portion 314 to the upper base portion 334 and a lower isolating connector assembly 342 that couples the lower flange portion 316 to the lower base portion 336. Other embodiments, however, may include a mounting flange and mounting base configured to be engaged by a different number of isolating connector assemblies 342, and/or at least one isolating connector assembly 342 may be arranged in a different position than those of the illustrated embodiments.

With continued reference to FIGS. 11 and 12, each isolating connector assembly 342 includes an elastomeric member 360, a compression limiter 362, and a fastener 364. The fastener 364 extends through the bore 346 in the mounting flange 312 and into threaded engagement with the bore 348 in the mounting base 323 to couple the front housing portion 214 to the rear housing portion 216. Similarly to the vibration isolating joints 140, 240 of FIGS. 1-10, the compression limiters 362 are rigid members that each have a rigid cylinder 366 with a bore 368 through which the fastener 364 extends. The compression limiters 362 include a first limiter portion 370 and a second limiter portion 372. The first limiter portion 370 includes a first annular flange 374 and a first cylinder half 376, and the second limiter portion 372 includes a second annular flange 378 and a second cylinder half 380. The first limiter portion 370 is located between the mounting flange 312 of the rear housing portion 216 and the mounting base 332 of front housing portion 214. The second limiter portion 372 is located on an opposite side of the mounting flange 312 of the rear housing portion 216. The first limiter portion 370 and the second limiter portion 372 oppose each other such that the first and second cylinder halves 376, 380 abut each other to form the rigid cylinder 366. Together, the first limiter portion 370 and second limiter portion 372 define an axial space 382 between the first and second annular flanges 374, 378 in which elastomeric member 360 is located, as illustrated in FIG. 12.

The elastomeric members 360 each have a first resilient portion 386 located between the mounting flange 312 and the mounting base 332 and a second resilient portion 388 located on an opposite side of the mounting flange 312 relative to the first resilient portion 386. The first resilient portions 386 and the second resilient portions 388 are configured to be received in the counterbored holes 346. Referring to FIGS. 11 and 12, an annular flange 390 of the first resilient portion 386 abuts the front surface of the annular ring 350 and an annular flange 390 of the second resilient portion 388 abuts the rear surface of the annular ring 350. The first and second resilient portions 386, 388 each include a bore 392 configured to respectively receive the first and second cylinder halves 376, 380 of the first and second limiter portions 370, 372. When assembled, the first resilient portion 386 is located between the first limiter portion 370 and the mounting flange 312 of the rear housing portion 216 and the second resilient portion 388 is located between the second limiter portion 372 and the mounting flange 312 of the rear housing portion 216. Thus, the elastomeric member 360 is clamped in the axial space 382 between the first annular flange 374 and the second annular flange 378.

The vibration isolating joint further may additionally or alternatively include an annular O-ring seal disposed inside the front housing portion 214 and between the rear housing portion 216 and the front housing portion 214. In the non-limiting illustrated embodiment, each of the O-rings 326 received in the annular grooves 324 is one of a pair of annular O-ring seals disposed inside the front housing portion 214 and between the motor support portion 318 of the rear housing portion 216 and the front housing portion 214. Other embodiment may include at least one additional O-ring, or at least one of the O-rings may be omitted.

With continued reference to FIGS. 11 and 12, to assemble the vibration isolating joint 340 and couple the front housing portion to the rear housing portion 216, the elastomeric members 360 are inserted into the counterbored holes 346 by placing the first resilient portions 386 in a front opening of a counterbored hole 346 and the second resilient portion 388 in a rear opening of said counterbored hole 346. The compression limiters 362 are then received in the elastomeric members 360 by inserting the first cylinder halves 376 into the bores 392 of the first resilient portions 386 and the second cylinder halves 380 into the bores 392 of the second resilient portions 388. The fasteners 364 extend through the elastomeric members 360 and the compression limiters 362 to engage the bores 348 formed in the mounting base 332.

Tightening the fasteners 364 clamps the elastomeric members 360 between the front housing portion 214 and rear housing portion 216 until engagement between the fasteners 364 and the compression limiters 362 prevents further tightening of the fasteners 364. In the non-limiting illustrated embodiments, tightening of the fasteners 364 clamps the first resilient portions 386 between the first limiter portions 370 of the compression limiters 362 and the mounting flange 312 and the second resilient portion 388 between the second limiter portion 372 and the mounting flange 312. The axial space 382 between the first and second annular flanges 374, 378 of the compression limiters 362 has a length L3 which is preselected to prevent over compression of the elastomeric member 360 by the fastener 364.

Thus, the compression limiters 362 prevent over tightening of the fasteners 364 to thereby prevent over compression of the elastomeric member 360. The elastomeric members 360, which are clamped between the mounting flange 312 the mounting base 332, advantageously limit the transfer of vibrations from the rear housing portion 216 to the front housing portion 214. All vibrations emanating from the electric motor 220 are transferred to the elastomeric members 360 before being transferred to the extension leg. When used alone or in conjunction the other vibration isolating joints 140, 240 and vibration isolating features disclosed herein, this may be particularly useful in reducing problematic noise and increasing overall noise quality of the marine drive. The compression limiters 362 prevent over clamping of the elastomeric member during assembly of the motor housing 202. By limiting compression of the elastomeric members 360, a predetermined pressure can be loaded onto the elastomeric members. The predetermined load may be selected to limit the transmission of undesirable sound frequencies through the elastomeric members 360 from the rear housing portion 216 to the front housing portion 214.

Figure 13:
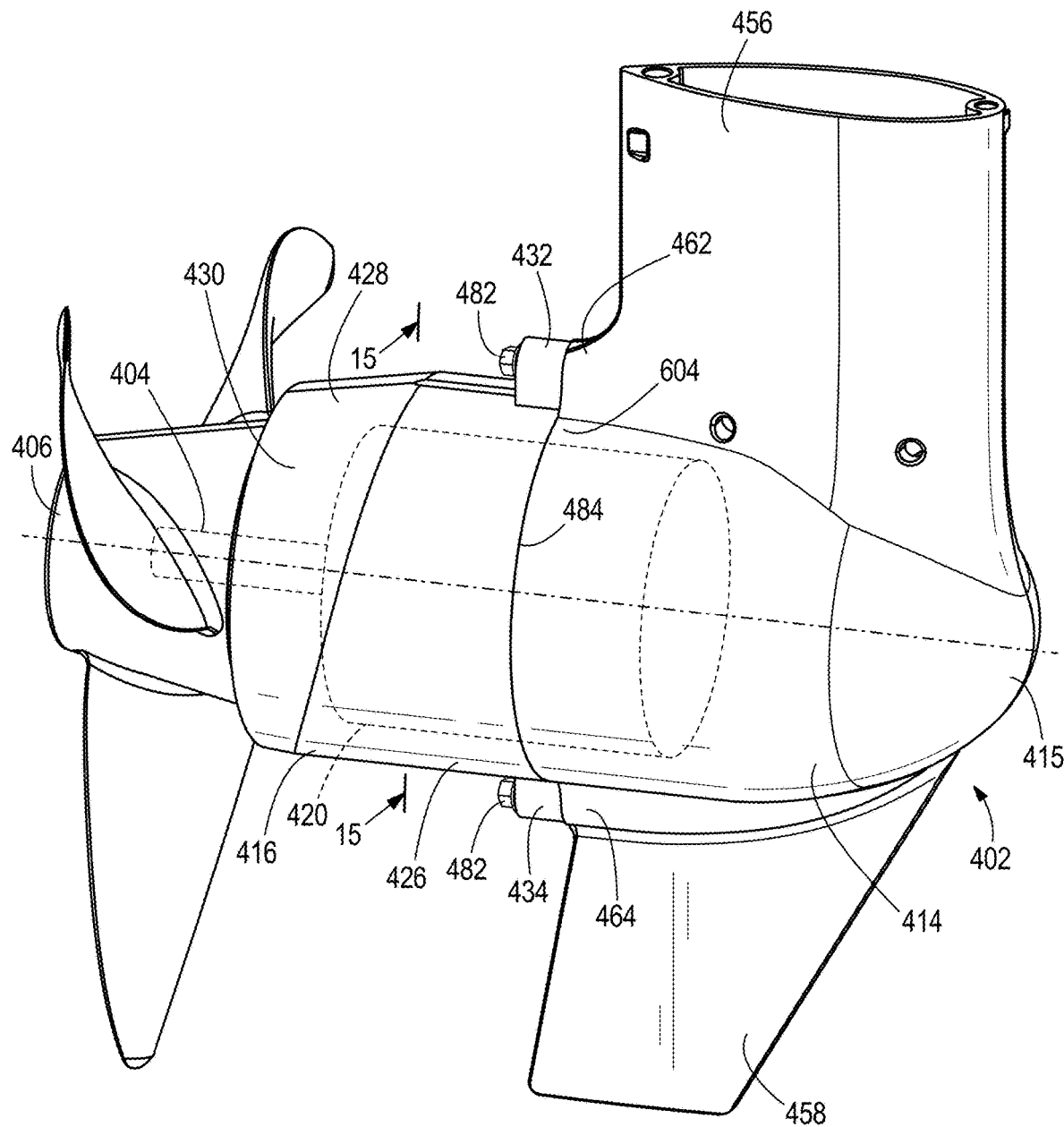
FIG. 13 is a perspective view of a motor housing of a third embodiment of a marine drive.
Figure 14:
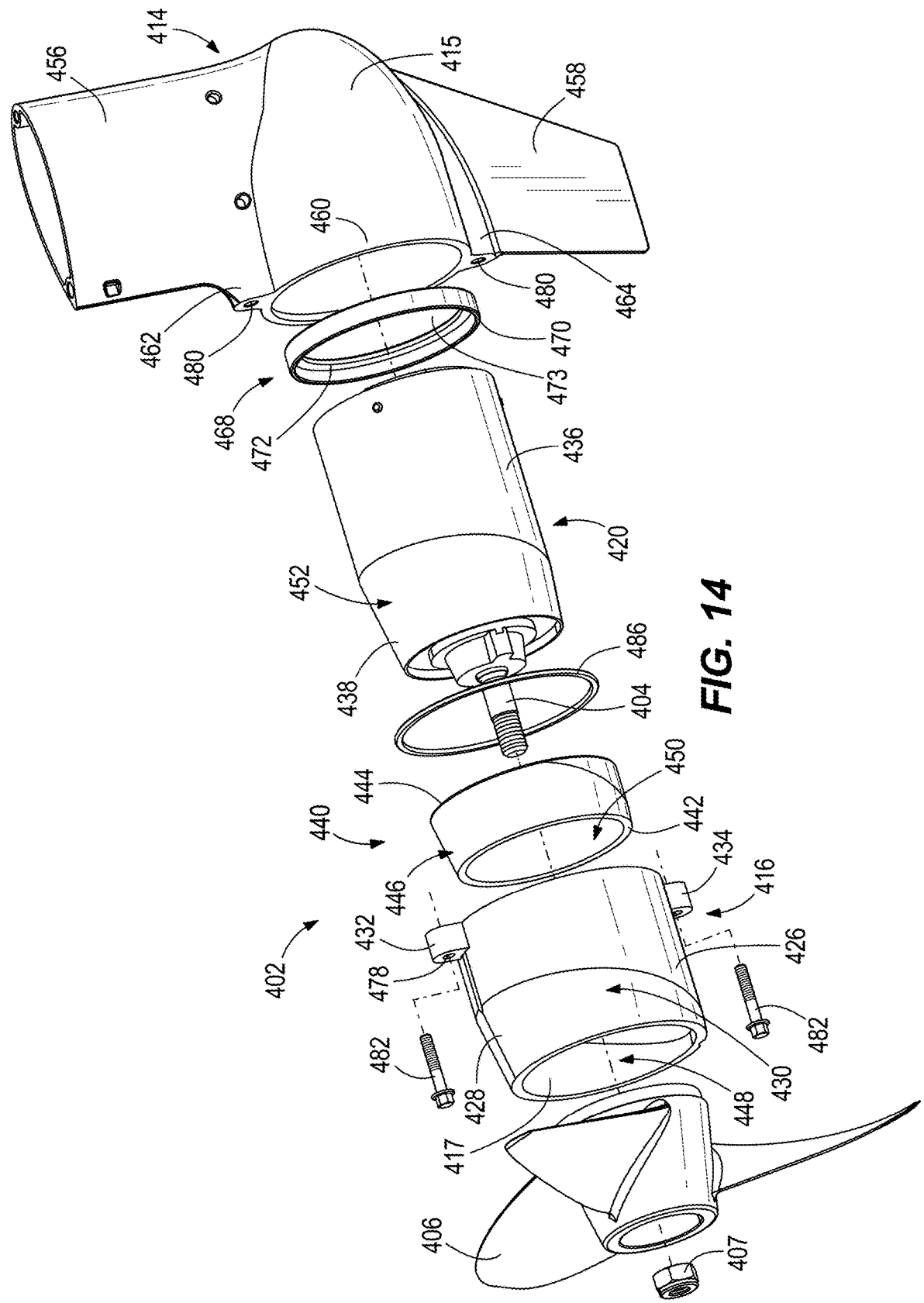
FIG. 14 is an exploded view of what is shown in FIG. 13.
Figure 15:
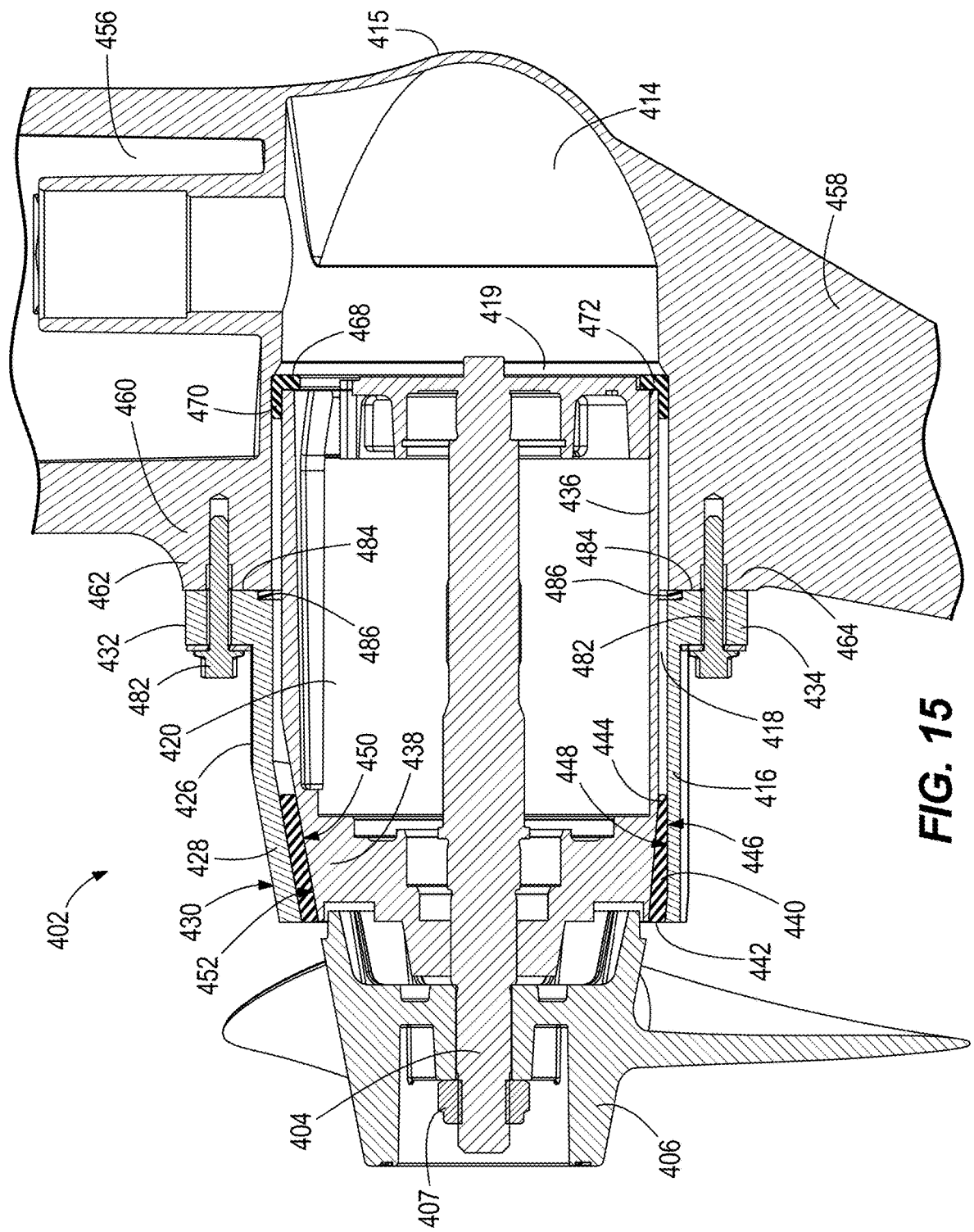
FIG. 15 is a view of Section 15-15, taken in FIG. 13.

In addition or as an alternative to a vibration isolating joint, such as the vibration isolating joints 140, 240, 340 of FIGS. 1-12, embodiments of a marine drive may be configured with noise isolating features within the motor housing. For example, FIGS. 13-15 illustrate a non-limiting embodiment of a motor housing 402 including vibration isolating elastomeric isolators 440, 468, configured to isolate vibrations emanating from an electric motor 420 and limit the transfer of those vibrations from the electric motor 420 to the motor housing 402. The motor housing 402 generally includes front housing portion 414 and a rear housing portion 416 which together define a motor cavity 418 for containing the electric motor 420 and related componentry. The electric motor 420 is nested within the rear housing portion 416 and is configured to cause rotation of an output shaft 404 extending from the rear housing portion 416. A propulsor 406 is coupled to the output shaft 404 so that rotation of the output shaft 404 causes rotation of the propulsor 406. In the illustrated embodiments, the propulsor 406 is secured to the output shaft 404 by a nut 407. Some embodiments, however, may include a propulsor that is secured to the output shaft using a different attachment method.

Referring to FIGS. 14 and 15, the rear housing portion 416 has a generally cylindrical section 426 at the front axial end of the rear housing portion 416 and a truncated conical section 428 at the rear axial end of the rear housing portion 416. An exterior side wall 430 of the rear housing portion 416 smoothly tapers radially inwardly towards its rear axial end. In the illustrated embodiments, the truncated conical section 428 has an oblique truncated conical shape such that an upper portion of the exterior side wall 430 has a larger taper angle and tapers further radially inward than a lower portion of the exterior side wall 430. Other embodiments of a rear housing portion, however, may have a symmetric truncated conical section or any other inwardly tapering shape. The rear housing portion 416 has a radially outer mounting flange positioned proximate a forward end of rear housing portion 416. The outer mounting flange includes an upper flange portion 432 extending upwardly from a top side of the exterior side wall 430 and a lower flange portion 434 extending downwardly from a bottom side of the exterior side wall 430.

The electric motor 420 is configured to be nested within the front housing portion 414 and the rear housing portion 416. The electric motor 420 has a generally cylindrical front section 436 and a truncated conical rear section 438 with a conical radially outer surface 439 which smoothly tapers radially inwardly towards its rear end. A first elastomeric isolator 440 is located radially between the electric motor 420 and the rear housing portion 416. The first elastomeric isolator 440 has a truncated conical shape that extends between a narrow end 442 and a wide end 444. The first elastomeric isolator 440 is nested in the rear housing portion 416 such that a conical radially outer surface 446 of the first elastomeric isolator 440 abuts a conical inner surface 448 of the rear housing portion 416. The electric motor 420 is nested within the truncated conical shape of the first elastomeric isolator 440 such that the first elastomeric isolator 440 is positioned on a first axial end of the electric motor 420. A conical inner surface 450 of the first elastomeric isolator 440 abuts a conical radially outer surface 452 of the electric motor 420, and the output shaft 404 of the electric motor 420 protrudes from the narrow end 442 of the first elastomeric isolator 440 and a rear opening 417 of the rear housing portion 416. In the illustrated nested configuration, the first elastomeric isolator 440 is sandwiched between the electric motor 420 and the rear housing portion 416 such that the first elastomeric isolator provides a watertight seal between the electric motor 420 and the rear housing portion 416. In some embodiments the first elastomeric isolator may be bonded to the electric motor 420. In other embodiments, the first elastomeric isolator 440 may be clamped in between the electric motor 420 and the rear housing portion 416 without adhesives or bonding.

The front housing portion 414 has a nosecone 415 with a smooth outer surface which transitions to an upwardly extending stem 456 and a downwardly extending skeg 458. A rear-facing annular body portion 460 of the front housing portion 414 is configured to receive a second axial end of the electric motor 420 in a nested arrangement. A second elastomeric isolator 468 isolator is located on the second axial end of the electric motor 420 which is opposite the first axial end of the electric motor 420. The second elastomeric isolator 468 is positioned radially between the electric motor 420 and the front housing portion 414. A cylindrical portion of the second elastomeric isolator 468 extends radially around the electric motor 420, and an annular lip 472 of the second elastomeric isolator 468 abuts a front surface of the electric motor 420 between the electric motor 420 and a front end wall 419 of the motor cavity 418. The annular lip defines a pilot hole 473 of the second elastomeric isolator 468, and the second axial end of the electric motor 420 extends through the pilot hole 473.

With continued reference to FIGS. 14 and 15, the annular body portion 460 of the front housing portion 414 includes a mounting base with an upper base portion 474 and a lower base portion 464 respectively positioned at the top and bottom sides of annular body portion 460. The upper flange portion 432 and the lower flange portion 434 each include bores 478 formed longitudinally through said flange portions 432, 434. The bores 478 in the mounting flange are arranged in axial alignment with corresponding bores 480 formed through the upper base portion 474 and the lower base portion 476 of the mounting base, respectively. Fasteners 482 extend through the bores 478 in the upper and lower flange portions 432, 434 to engage the corresponding bores 480 in the upper and lower base portions 474, 476, thereby fastening the rear housing portion 416 to the front housing portion 414 along a split line 484. An elastomeric O-ring seal 486 extends radially around the electric motor 420 and is disposed between the front housing portion 414 and the rear housing portion 416 and along the split line 484 to provide a watertight seal therebetween.

To assemble the motor housing 402, the first elastomeric isolator 440 is inserted into the rear housing portion 416 and the electric motor is subsequently nested in the rear housing portion 416 such that the first elastomeric isolator 440 is inserted radially between the electric motor 420 and the rear housing portion 416 with the output shaft 404 axially extending from the back end of the rear housing portion 416. The second elastomeric isolator 468 is received in the front housing portion 414 and the second axial end of the electric motor 420 is nested in the front housing portion 414 such that the second elastomeric isolator 468 is inserted radially between the electric motor 420 and the front housing portion 414. In some embodiments at least one additional elastomeric O-ring seal (not shown) may be located in the front housing portion 414 and/or the rear housing portion 416 so as to provide a watertight seal between the electric motor 420 and the front housing portion 414 and/or the rear housing portion 416.

The elastomeric O-ring seal 486 is sandwiched between the front housing portion 414 and the rear housing portion 416 at the split line 484, and the fasteners 482 are inserted through the bores 478 formed through the upper and lower portions 432, 434 of the mounting flange to threadedly engage the corresponding bores 480 formed in the upper and lower portions 474, 476 of the mounting base, thereby fastening the front housing portion 414 to the rear housing portion 416. As the fasteners 482 are tightened, the first elastomeric isolator 440 is compressed between the rear housing portion 416 and the electric motor 420, the second elastomeric isolator 468 is compressed between the front housing portion 414 and the electric motor 420, and the elastomeric O-ring seal 486 is compressed between the front housing portion 414 and the rear housing portion 416. When compressed the first elastomeric isolator 440 is sandwiched between the electric motor 420 and the rear housing portion 416 to provide a watertight seal between the electric motor 420 and the rear first housing portion 416. Similarly, the elastomeric O-ring seal 486 is sandwiched between the front housing portion 414 and the rear housing portion 416 to provide a watertight seal between the front housing portion 414 and the rear first housing portion 416.

As previously mentioned, the elastomeric isolators 440, 468 are configured to isolate vibrations of the electric motor 420 and limit the transfer of said vibrations between various different parts of the marine drive. Positioned between the electric motor 420 and the rear housing portion 416, the first elastomeric isolator 440 is configured to isolate vibrations emanating from the electric motor 420 and limit transfer of said vibrations to the rear housing portion 416. The second elastomeric isolator 468 is similarly configured to isolate vibrations emanating from the electric motor 420 and limit transfer of said vibrations to the front housing portion 414. In some embodiments, the elastomeric O-ring seal 486 may be configured as a third elastomeric isolator that is configured to isolate vibrations created by the electric motor 420 and limit transfer of said vibrations between the front housing portion 414 and the rear housing portion 416 . . . .

Providing multiple elastomeric isolators may advantageously provide redundant vibration isolation to reduce the level of sound produced by the electric motor.

In some non-limiting embodiments, at least one of the elastomeric isolators 440, 468 may be tuned to isolate a selected range of vibration frequencies emanating from the electric motor 420 and/or between the front housing portion 414 and the rear housing portion 416. This may be useful, for example, in order to effectively isolate sound-creating vibrations and improve the overall sound quality of the marine drive. Each of the elastomeric isolators 440, 468, may be formed from a material selected in order to isolate selected frequency ranges. The first elastomeric isolator 440 may have a first stiffness that isolates a first range of vibration frequencies, the second elastomeric isolator 468 may have a second stiffness that isolates a second range of vibration frequencies, the third elastomeric isolator 486 (i.e., the O-ring seal 486) may have a third stiffness that isolates a third range of vibration frequencies. In some embodiments each of the elastomeric isolators 440, 468 may be configured to isolate different ranges of vibration frequencies, while other embodiments may include at least two elastomeric isolators have materials selected to isolate the same range of vibration frequencies and/or overlapping ranges of vibration frequencies.

In the present disclosure, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A marine drive comprising:
    a motor housing having a first housing portion and a second housing portion that together define a motor cavity;
    an electric motor in the motor housing, the electric motor configured to power a propulsor; and
    an elastomeric isolator located radially between the electric motor and the first housing portion, the elastomeric isolator being configured to isolate vibrations emanating from the electric motor and limit transfer of said vibrations to the first housing portion, wherein elastomeric isolator comprises a conical inner surface that abuts a conical radially outer surface of the electric motor.

2. A marine drive comprising:
    a motor housing having a first housing portion and a second housing portion that together define a motor cavity;
    an electric motor in the motor housing, the electric motor configured to power a propulsor; and
    an elastomeric isolator located radially between the electric motor and the first housing portion, the elastomeric isolator being configured to isolate vibrations emanating from the electric motor and limit transfer of said vibrations to the first housing portion, wherein the elastomeric isolator is bonded to the electric motor.

3. A marine drive comprising:
    a motor housing having a first housing portion and a second housing portion that together define a motor cavity;
    an electric motor in the motor housing, the electric motor configured to power a propulsor; and
    an elastomeric isolator located radially between the electric motor and the first housing portion, the elastomeric isolator being configured to isolate vibrations emanating from the electric motor and limit transfer of said vibrations to the first housing portion, wherein the elastomeric isolator has a truncated conical shape, and wherein the electric motor is nested in the truncated conical shape.

4. The marine drive according to claim 3, wherein the truncated conical shape axially extends between a narrow end and a wide end, and wherein an output shaft of the electric motor protrudes from the narrow end.

5. A marine drive comprising:
a motor housing having a first housing portion and a second housing portion that together define a motor cavity;
an electric motor in the motor housing, the electric motor configured to power a propulsor; and
an elastomeric isolator located radially between the electric motor and the first housing portion, the elastomeric isolator being configured to isolate vibrations emanating from the electric motor and limit transfer of said vibrations to the first housing portion, wherein the first housing portion is fastened to the second housing portion along a split line and further comprising an elastomeric O-ring seal disposed between the first housing portion and the second housing portion and along the split line, wherein the elastomeric O-ring seal provides a watertight seal between the first housing portion and the second housing portion.

6. The marine drive according to claim 5, wherein the first housing portion is fastened to the second housing portion and wherein fastening the first housing portion to the second housing portion compresses the elastomeric isolator between the first housing portion and the electric motor.

7. The marine drive according to claim 5, wherein an output shaft of the electric motor extends from a rear opening of the first housing portion and the elastomeric isolator provides a watertight seal between the electric motor and the first housing portion.

8. The marine drive according to claim 5, wherein the elastomeric isolator is a first elastomeric isolator located on a first axial end of the electric motor and further comprising a second elastomeric isolator located on a second axial end of the electric motor that is opposite the first axial end.

9. The marine drive according to claim 8, wherein the second elastomeric isolator comprises a pilot hole through which the second axial end of the electric motor extends.

10. The marine drive according to claim 9, wherein the second elastomeric isolator includes a cylindrical portion that extends radially around the electric motor and an annular lip that defines the pilot hole and abuts a front surface of the electric motor.

11. A marine drive comprising:
a motor housing having a first housing portion and a second housing portion that together define a motor cavity;
an electric motor in the motor housing, the electric motor configured to power a propulsor; and
a first elastomeric isolator located radially between the electric motor and the first housing portion, the first elastomeric isolator being configured to isolate vibrations emanating from the electric motor and limit transfer of said vibrations to the first housing portion, wherein the first elastomeric isolator is located on a first axial end of the electric motor; and
a second elastomeric isolator located on a second axial end of the electric motor that is opposite the first axial end, wherein the first elastomeric isolator is configured to isolate vibrations of the electric motor to the first housing portion and wherein the second elastomeric isolator is configured to isolate vibrations of the electric motor to the second housing portion.

12. A marine drive comprising:
a motor housing having a first housing portion and a second housing portion that together define a motor cavity;
an electric motor in the motor housing, the electric motor configured to power a propulsor; and
a first elastomeric isolator located radially between the electric motor and the first housing portion, the first elastomeric isolator being configured to isolate vibrations emanating from the electric motor and limit transfer of said vibrations to the first housing portion, wherein the first elastomeric isolator is located on a first axial end of the electric motor;
a second elastomeric isolator located on a second axial end of the electric motor that is opposite the first axial end, wherein the first elastomeric isolator is configured to isolate a first selected range of vibration frequencies emanating from the electric motor and the second elastomeric isolator is configured to isolate a second selected range of vibration frequencies emanating from the electric motor.

13. The marine drive according to claim 12, wherein the first selected range of vibration frequencies is different than the second selected range of vibration frequencies.

14. A marine drive comprising:
a motor housing having a first housing portion and a second housing portion which that together define a motor cavity;
an electric motor in the motor housing, the electric motor configured to power a propulsor;
a first elastomeric isolator located radially between the electric motor and the first housing portion, the first elastomeric isolator being configured to isolate vibrations emanating from the electric motor and limit transfer of said vibrations to the first housing portion; and
a second elastomeric isolator located radially between the electric motor and the second housing portion, the second elastomeric isolator being configured to isolate vibrations emanating from the electric motor and limit transfer of said vibrations to the second housing portion;
wherein the first elastomeric isolator and the second elastomeric isolator are each tuned to isolate a different selected range of vibration frequencies emanating from the electric motor, respectively.

15. The marine drive according to claim 14, wherein the first elastomeric isolator has a first stiffness and the second elastomeric isolator has a second stiffness that is different than the first stiffness such that the selected range of vibration frequencies isolated by the first elastomeric isolator is different than the selected range of vibration frequencies isolated by the second elastomeric isolator.

16. The marine drive according to claim 15, wherein the first housing portion is fastened to the second housing portion along a split line and further comprising an elastomeric O-ring seal disposed between the first housing portion and the second housing portion and along the split line, wherein the elastomeric O-ring seal provides a watertight seal between the first housing portion and the second housing portion.

17. A method of making a marine drive, the method comprising:
providing a motor housing having a first housing portion and a second housing portion that together define a motor cavity;

nesting an electric motor in the first housing portion, the electric motor being configured to power a propulsor;

providing a first elastomeric isolator of a material selected to isolate a first selected range of vibration frequencies emanating from the electric motor;

inserting the first elastomeric isolator radially between the electric motor and the first housing portion such that the first elastomeric isolator isolates the first selected range of vibrations emanating from the electric motor and limits transfer of said first selected range of vibrations to the first housing portion;

providing a second elastomeric isolator of a material selected to isolate a different, second selected range of vibration frequencies emanating from the electric motor; and inserting the second elastomeric isolator radially between the electric motor and the second housing portion such that the second elastomeric isolator isolates the second selected range of vibrations emanating from the electric motor and limits transfer of said second selected range of vibrations to the second housing portion.

18. The method according to claim 17, wherein inserting the first elastomeric isolator radially between the electric motor and the first housing portion comprises sandwiching the first elastomeric isolator between the electric motor and the first housing portion to provide a watertight seal between the electric motor and the first housing portion.

19. The method according to claim 18, further comprising providing an elastomeric O-ring seal and sandwiching the elastomeric O-ring seal between the first housing portion and the second housing portion such that the elastomeric O-ring seal provides a watertight seal between the first housing portion and the second housing portion.

* * * * *